(12) United States Patent
Nonaka et al.

(10) Patent No.: US 7,860,255 B2
(45) Date of Patent: Dec. 28, 2010

(54) CONTENT DISTRIBUTION SERVER, KEY ASSIGNMENT METHOD, CONTENT OUTPUT APPARATUS, AND KEY ISSUING CENTER

(75) Inventors: Masao Nonaka, Osaka (JP); Yuichi Futa, Osaka (JP); Motoji Ohmori, Osaka (JP); Shigeru Yamada, Osaka (JP); Tetsuya Inoue, Osaka (JP); Yoji Kumazaki, Aichi (JP)

(73) Assignee: Panasonic Corporation, Osaka (JP)

( * ) Notice: Subject to any disclaimer, the term of this patent is extended or adjusted under 35 U.S.C. 154(b) by 910 days.

(21) Appl. No.: 10/577,448

(22) PCT Filed: Dec. 15, 2004

(86) PCT No.: PCT/JP2004/019124

§ 371 (c)(1), (2), (4) Date: Apr. 27, 2006

(87) PCT Pub. No.: WO2005/059776

PCT Pub. Date: Jun. 30, 2005

(65) Prior Publication Data
US 2007/0033416 A1 Feb. 8, 2007

(30) Foreign Application Priority Data
Dec. 17, 2003 (JP) .............................. 2003-419765

(51) Int. Cl.
*H04L 9/08* (2006.01)
(52) U.S. Cl. ...................................... 380/279
(58) Field of Classification Search ........................ None
See application file for complete search history.

(56) References Cited

U.S. PATENT DOCUMENTS

| 7,308,583 | B2 | 12/2007 | Matsuzaki et al. | |
| 7,343,324 | B2 * | 3/2008 | Lao et al. ...................... | 705/26 |
| 2002/0076204 | A1 | 6/2002 | Nakano et al. | |
| 2003/0051151 | A1 * | 3/2003 | Asano et al. ................. | 713/193 |
| 2003/0161474 | A1 | 8/2003 | Matsuzaki et al. | |

FOREIGN PATENT DOCUMENTS

| EP | 1 215 844 | 6/2002 |
| JP | 2002-281013 | 9/2002 |
| JP | 2003-289297 | 10/2003 |
| WO | WO 02/078419 | * 10/2002 |

OTHER PUBLICATIONS

Canetti, R., et al. "*Multicast Security: A Taxonomy and Some Efficient Constructions*", INFOCOM '99, Eighteenth Annual Joint Conference of the IEEE Computer and Communications Societies, Proceedings, IEEE New York, NY, USA, Mar. 21-25, 1999, Piscataway, NJ, USA, IEEE, US, vol. 2, Mar. 21, 1999, pp. 708-716, XP010323810.

(Continued)

*Primary Examiner*—Jeffrey D Popham
(74) *Attorney, Agent, or Firm*—Wenderoth, Lind & Ponack, L.L.P.

(57) ABSTRACT

A content distribution system distributes contents. The content distribution system includes a key issuing center, a server, eight output apparatuses, and a communication path that connects them to each other. The key issuing center and each of the output apparatuses are previously given an individual key shared between them. For example, the key issuing center shares individual key IKa with an output apparatus, individual key IKb with an output apparatus, and individual key IKh with an output apparatus.

13 Claims, 35 Drawing Sheets

Cycle of change in individual keys for encrypting scramble key

OTHER PUBLICATIONS

"*Dejitaru Hosokyoku Sisutemu no Shikumi* (*Mechanism of Digital Broadcasting Station System*)", Japanese non patent literature, pp. 134-136.

"*BS Dejitaru Houso vo gentei jushin shisutemu to sono kanri—unei* (*The Conditional Access System for BS Digital Broadcasting and its Management/Operation*)", Japanese non patent literature, pp. 59-71.

\* cited by examiner

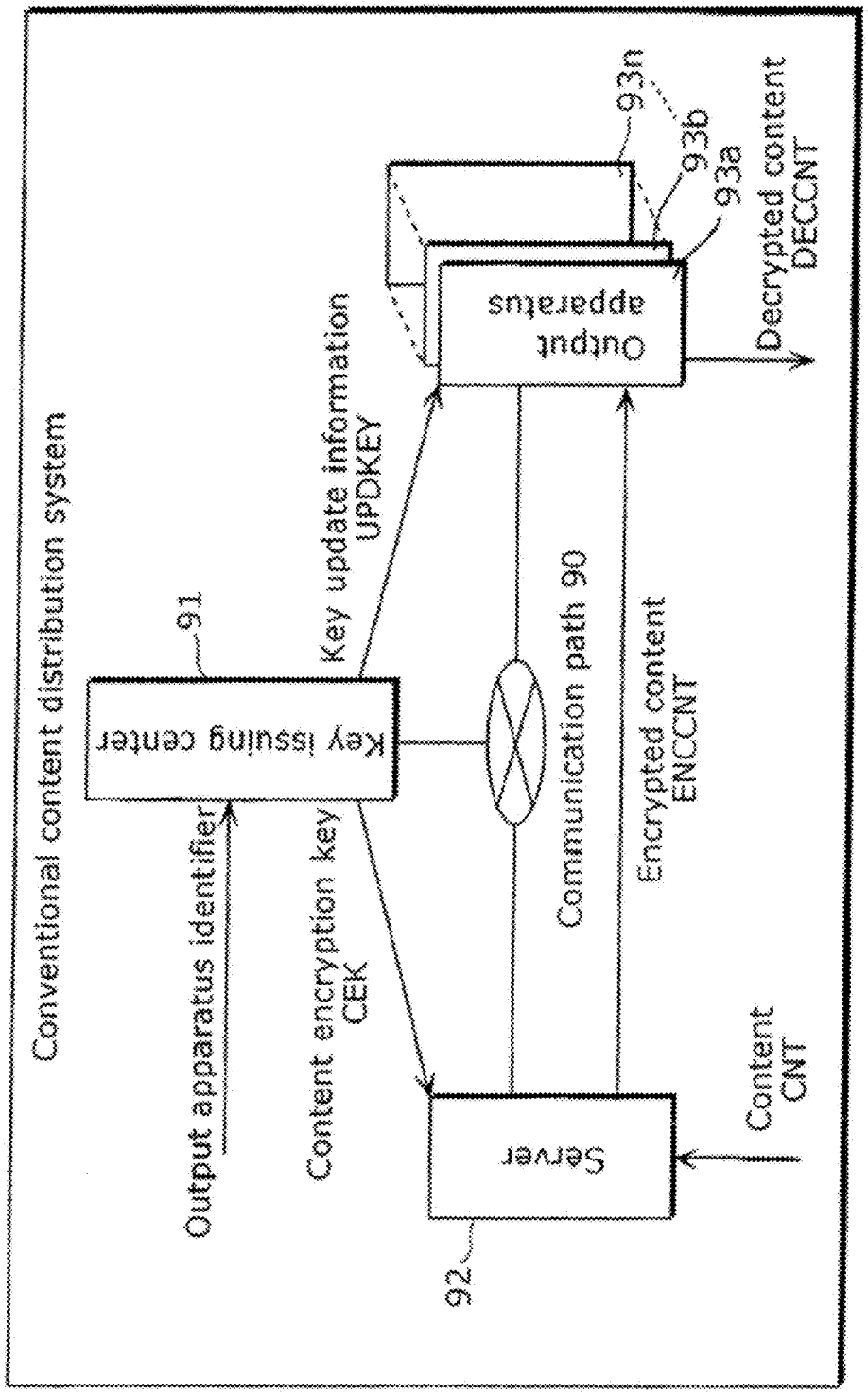

CONTENT DISTRIBUTION SERVER, KEY ASSIGNMENT METHOD, CONTENT OUTPUT APPARATUS, AND KEY ISSUING CENTER

BACKGROUND OF THE INVENTION

1. Technical Field

This invention relates to a content distribution system for encrypting digital contents such as movies and music works and distributing the encrypted contents to a plurality of output apparatuses, in particular to a technology of assigning a unique key to be used for decrypting an encrypted content to each output apparatus so that, even if a key assigned to an output apparatus is leaked, the output apparatus which leaked the key can be traced.

2. Background Art

With the proliferation of high-speed communication paths, notably, Asymmetrical Digital Subscriber Line (ADSL), optical fibers and the like, services which provide digitalized contents such as music and video via a communication path have been actively introduced. With the introduction of such services, there has been a need for copyright protection methods for preventing unauthorized use of contents such as unauthorized duplication. In general, an encryption technology is used for the copyright protection method for preventing the unauthorized use of contents. That is, a digital content is encrypted with a content encryption key and distributed through a communication path, and only an output apparatus having a content decryption key corresponding to the content encryption key can decrypt the encrypted content so as to reproduce the original digital content.

By the way, in general, a content decryption key assigned to each output apparatus is secretly stored. However, there is a possibility that an attacker may obtain a content decryption key commonly assigned to all output apparatuses. When the content decryption key assigned to a terminal is once leaked, there is a threat that an attacker may create an unauthorized terminal which decrypts a digital content using the content decryption key of which leakage cannot be traced, and use the content in an unauthorized manner. As a means for preventing such unauthorized use of contents, a system which can trace an output apparatus which is the origin of leakage by assigning a key individually for each output apparatus is suggested. In a broadcasting station type content distribution in which the same data is distributed to all the output apparatuses, as a method for preventing unauthorized use of contents, there is, for example, a content distribution system disclosed in the non patent literature 1 (See "Dejitaru Hosokyoku Sisutemu no Shikumi (Mechanism of Digital Broadcasting Station System)", edited by The Institute of Image Information and Television Engineers, Ohm Publisher).

FIG. 35 shows a conventional content distribution system disclosed in the non patent literature 1. In FIG. 35, a communication path 90 is a communication path connecting a key issuing center 91, a server 92, and a plurality of output apparatuses 93a to 93n (which are to be described later) to each other, and is embodied in a network such as the Internet. The key issuing center 91 creates a content encryption key CEK and a content decryption key CDK for encrypting and decrypting a content CNT, and distributes the content encryption key CEK to the server 92 and the content decryption key CDK, as key update information UPDKEY=Enc (IKa, CDK) ||Enc (IKb, CDK|| . . . Enc (IKn, CDK), to a plurality of output apparatuses 93a to 93n. Here, Enc (K, P) is a cipher text obtained by encrypting a plaintext P using an encryption key K. IKa . . . IKn are individual keys which are previously given to respective pairs of the key issuing center 91 and the plurality of output apparatuses 93a to 93n. For example, the key issuing center 91 previously shares the individual key IKa with the output apparatus 93a, the individual key IKb with the output apparatus 93b, and the individual key IKn with the output apparatus 93n. The server 92 encrypts the content CNT based on the content encryption key CEK, distributes the encrypted content ENCCNT to the plurality of output apparatuses 93a to 93n. The plurality of output apparatuses 93a to 93n decrypt the encrypted content ENCCNT received based on the key update information UPDKEY, and output the decrypted content DECCNT to the outside. Here, the content encryption key CEK and the content decryption key CDK have the values common to all the output apparatuses 93a to 93n. Therefore, an attacker who obtained an individual key may create an unauthorized output apparatus having the embedded content decryption key CDK of which leakage cannot be traced. However, if the key issuing center 91 updates the content encryption key CEK and the content decryption key CDK to the new values, it is possible to revoke such an unauthorized output apparatus having the content decryption key CDK embedded therein so that it cannot use contents in the future.

Here, the operations of respective constituents are explained in more detail. First, a method for sharing a content decryption key CDK among all the output apparatuses 93a to 93n is explained. The key issuing center 91 generates a content encryption key CEK and a content decryption key CDK, and transmits the content encryption key CEK to the server 92. Next, it encrypts the content decryption key CDK based on the individual keys IKa, IKb, . . . IKn previously shared respectively with the output apparatuses 93a to 93n, and distributes the value of a concatenation of respective cipher texts Enc (IKa, CDK), Enc (IKb, CDK), . . . and Enc (IKn, CDK) to the plurality of output apparatuses 93a to 93n as key update information UPDKEY=Enc (IKa, CDK)||Enc (IKb, CDK)|| . . . Enc (IKn, CDK). The server 92 receives the content encryption key CEK, while the output apparatus 93a receives the key update information UPDKEY, extracts the cipher text (IKa, CDK) that corresponds to the individual key IKa of its own from the key update information UPDKEY, decrypts the cipher text Enc (IKa, CDK) based on the individual key IKa, and obtains the content decryption key CDK. Note that in the case of the output apparatuses 93b to 93n other than the output apparatus 93a, each of them extracts the cipher text that corresponds to its own individual key from the key update information UPDKEY, decrypts the cipher text, and obtains the content decryption key CDK, in the same manner as the output apparatus 93a. By doing so, the contend decryption key CDK can be shared among all the output apparatuses 93a to 93n.

Next, the operations in the case where a content is distributed are explained. First, the server 92 receives the content CNT from outside, encrypts the content CNT based on the content encryption key CEK, and distributes the encrypted content ENCCNT=Enc (CEK, CNT) to the plurality of output apparatuses 93a to 93n. The plurality of output apparatuses 93a to 93n which received the encrypted content ENCCNT decrypt the encrypted content ENCCNT based on the content decryption key CDK and output the decrypted content DECCNT to the outside.

Note that the key issuing center 91 can revoke an output apparatus having a specific individual key so that it cannot decrypt a content CNT. Here is an explanation of the case where an output apparatus having the individual key of the output apparatus 93a is revoked. First, the key issuing center 91 receives an output apparatus identifier AIDa for identifying the output apparatus 93a, newly generates a content encryption key CEK and a content decryption key CDK, and transmits the content encryption key CEK to the server 92. After that, it encrypts the content decryption key CDK using each of the individual keys IKb to IKn other than the individual key IKa which is previously shared with the output apparatus 93a that corresponds to the output apparatus identifier AIDa, and distributes, to the plurality of the output apparatuses 93a to 93n, the value of a concatenation of cipher texts Enc (IKb, CDK), . . . and Enc (IKn, CDK) as key update information UPDKEY=Enc (IKb, CDK)|| . . . Enc (IKn, CDK). Accordingly, the output apparatuses 93b to 93n other than the output apparatus 93a can obtain the content decryption key CDK, and thus can decrypt the encrypted content ENCCNT=Enc (CDK, CNT) properly. However, the output apparatus 93a that corresponds to the output apparatus identifier AIDa cannot obtain the content decryption key CDK so that it cannot decrypt the encrypted content ENCCNT=Enc (CDK, CNT). Note that, also in the case where the output apparatuses 93b to 93n other than the output apparatus 93a are revoked, the similar operations as in the output apparatus 93a are taken, but an individual key to be used for encrypting the content decryption key CDK differs. By doing so, the key issuing center 91 can revoke the output apparatus.

According to such system, even if an attacker obtains, in an unauthorized manner, an individual key embedded in any of the output apparatuses 93a to 93n and creates an output apparatus using the individual key, an output apparatus which is the origin of leakage can be traced from the individual key embedded in the unauthorized output apparatus. Therefore, it is possible to take measures such as a revocation of the output apparatus.

However, the above-mentioned conventional structure has a problem that when the key issuing center updates a content encryption key and a corresponding content decryption key in order to revoke an unauthorized output apparatus having the content decryption key embedded therein, the data size of key update information to be distributed to output apparatuses increases as the number of output apparatuses increases.

Disclosure of Invention

The present invention has been conceived in order to solve the above problem, and an object of the present invention is to provide a content distribution system that allows reduction of the size of data to be distributed to output apparatuses when a key issuing center updates a content encryption key and a corresponding content decryption key in order to revoke an unauthorized output apparatus having the content decryption key embedded therein.

In order to solve the above-mentioned conventional problem, the content distribution server according to the present invention is a content distribution server that encrypts a content and distributes the encrypted content to content output apparatuses connected to the content distribution server via a network, each of the content output apparatuses decrypting the encrypted content and outputting the decrypted content, the content distribution server including: a key information storage unit operable to hold a node encryption key group that is a set of node encryption keys which are previously assigned to the content output apparatuses using a predetermined key assignment method; an encryption key group selection unit operable to select, from among the node encryption key group, at least one node encryption key as a selected node encryption key group; a content decryption key selection unit operable to generate an encrypted content decryption key group that includes at least one encrypted content decryption key obtained by encrypting a previously given content decryption key using said at least one node encryption key in the selected node encryption key group; a content receiving unit operable to receive a content via the network; an encryption unit operable to encrypt the content using a content encryption key which is previously given as a pair with the content decryption key; and a transmission unit operable to distribute the encrypted content and the encrypted content decryption key group to the content output apparatuses.

The key assignment method according to the present invention is a key assignment method for assigning a node decryption key for obtaining a content decryption key to each of content output apparatuses connected with a content distribution server via a network, the content distribution server distributing a content encrypted using a content encryption key, the content output apparatus receiving the encrypted content and decrypting the encrypted content using the content decryption key, and the method having one or more tree structures, in each of which a plurality of content output apparatuses serve as nodes, and including: classifying the nodes into a plurality of levels from a 0th level through an nth level (n is 1 or a larger natural number); setting one or more pairs of node encryption keys and corresponding node decryption keys for all the nodes that make up the tree structure; selecting a terminal node in the tree structure, the terminal node being (i) a node that belongs to the nth level and (ii) a node that belongs to the jth level (j is a natural number from 1 to n−1) and is not connected by lines with any nodes belonging to the j+1th through the nth level; associating one of the terminal nodes with the content output apparatus to which the content is to be distributed, and assigning, to the output apparatus, a set of the node decryption keys which are set for respective nodes belonging to a relevant node set which is relevant to the associated terminal node, as a node decryption key group; and distributing the node decryption key group to the content output apparatus.

The content output apparatus according to the present invention is a content output apparatus that receives an encrypted content from a content distribution server via a network, decrypts the encrypted content using a content decryption key, and outputs the decrypted content, the apparatus including: a first receiving unit operable to receive the encrypted content and an encrypted content decryption key group which are distributed from the content distribution server; a second receiving unit operable to receive, via the network, a node decryption key group which is previously assigned by a predetermined key assignment method; a node key storage unit operable to hold the node decryption key group; a decryption key obtaining unit operable to obtain the content decryption key based on at least one node decryption key group and at least one encrypted content decryption key group; and a first decryption unit operable to decrypt the encrypted content using the content decryption key.

The key issuing center according to the present invention is a key issuing center that is connected, via a network, with a content distribution server and content output apparatuses, and issues a key for obtaining a content decryption key to each of the content output apparatuses, the content distribution server distributing an encrypted content to the content output apparatuses, each of which receives the encrypted content, decrypts the received content using the content decryption key and outputs the decrypted content, the key issuing center including: a node key generation unit operable to generate, based on a predetermined key assignment method, a node encryption key group that is a set of node encryption keys and a node decryption key group that is a set of node decryption keys, each of the node encryption keys and node decryption keys being assigned to each content output apparatus; a first transmission unit operable to transmit the node encryption key group to the content distribution server; a node decryption key group selection unit operable to select at least one of the node decryption keys, and generate the node decryption key group to be distributed to each content output apparatus; and a second transmission unit operable to distribute the node decryption key group to the content output apparatus.

The content distribution system according to the present invention is a content distribution system including content output apparatuses and a content distribution server, each of the content output apparatuses decrypting an encrypted content using a content decryption key and outputting the decrypted content, and a content distribution server creating an encrypted content by encrypting a content, and distributing the encrypted content to each content output apparatus via a network, wherein the content output apparatus includes: a first receiving unit operable to receive the encrypted content and an encrypted content decryption key group which are distributed from the content distribution server; a second receiving unit operable to receive, via the network, a node decryption key group which is previously assigned by a predetermined key assignment method; a node key storage unit operable to hold the node decryption key group; a decryption key obtaining unit operable to obtain the content decryption key based on at least one node decryption key group and at least one encrypted content decryption key group; and a first decryption unit operable to decrypt the encrypted content using the content decryption key, and the content distribution server includes: a key information storage unit operable to hold a node encryption key group that is a set of node encryption keys which are previously assigned to the content output apparatuses using a predetermined key assignment method; an encryption key group selection unit operable to select, from among the node encryption key group, at least one node encryption key as a selected node encryption key group; a content decryption key selection unit operable to generate an encrypted content decryption key group that includes at least one encrypted content decryption key obtained by encrypting a previously given content decryption key using said at least one node encryption key in the selected node encryption key group; a content receiving unit operable to receive a content via the network; an encryption unit operable to encrypt the content using a content encryption key which is previously given as a pair with the content decryption key; and a transmission unit operable to distribute the encrypted content and the encrypted content decryption key group to the content output apparatuses.

Note that in order to achieve the above-mentioned object, not only is it possible to embody the present invention as a content distribution method including, as steps, the characteristic units of the content distribution server, the content output apparatus and the key issuing center, but also as programs including all these steps. It should also be noted that such programs can not only be stored in a ROM and the like incorporated in the content distribution server, the content output apparatus and the key issuing center, but also be distributed on a recording medium such as a CD-ROM or via a communication network.

According to the content distribution system of the present invention, when the key issuing center updates a content encryption key and a corresponding content decryption key in order to revoke an unauthorized output apparatus embedded with a content decryption key whose leakage cannot be traced because it is common to all the output apparatuses, the size of data to be distributed to the output apparatuses is reduced. As a result, it becomes possible to update the content encryption key and the content decryption key more frequently even if a communication path allows transfer of only a limited size of data. Therefore, it is possible to improve resistance against attack of creating an unauthorized output apparatus having a content decryption key embedded therein whose leakage cannot be traced.

As further information about technical background to this application, the disclosure of Japanese Patent Application No. 2003-419765 filed on Dec. 17, 2003 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 35 is a diagram showing an overview of a conventional content distribution system.

DETAILED DESCRIPTION OF THE INVENTION

An embodiment of the content distribution system according to the present invention is explained hereafter with reference to diagrams.

(First Embodiment)

A content distribution system 1 is explained as an embodiment according to the present invention. Firstly, an outline of the present embodiment is explained with reference to FIG. 1. Note that the following explanation is made on the assumption that the content distribution system 1 includes eight output apparatuses for outputting contents, but the content distribution system of the present invention can be embodied if it includes any other number of output apparatuses than eight.

Figure 1:
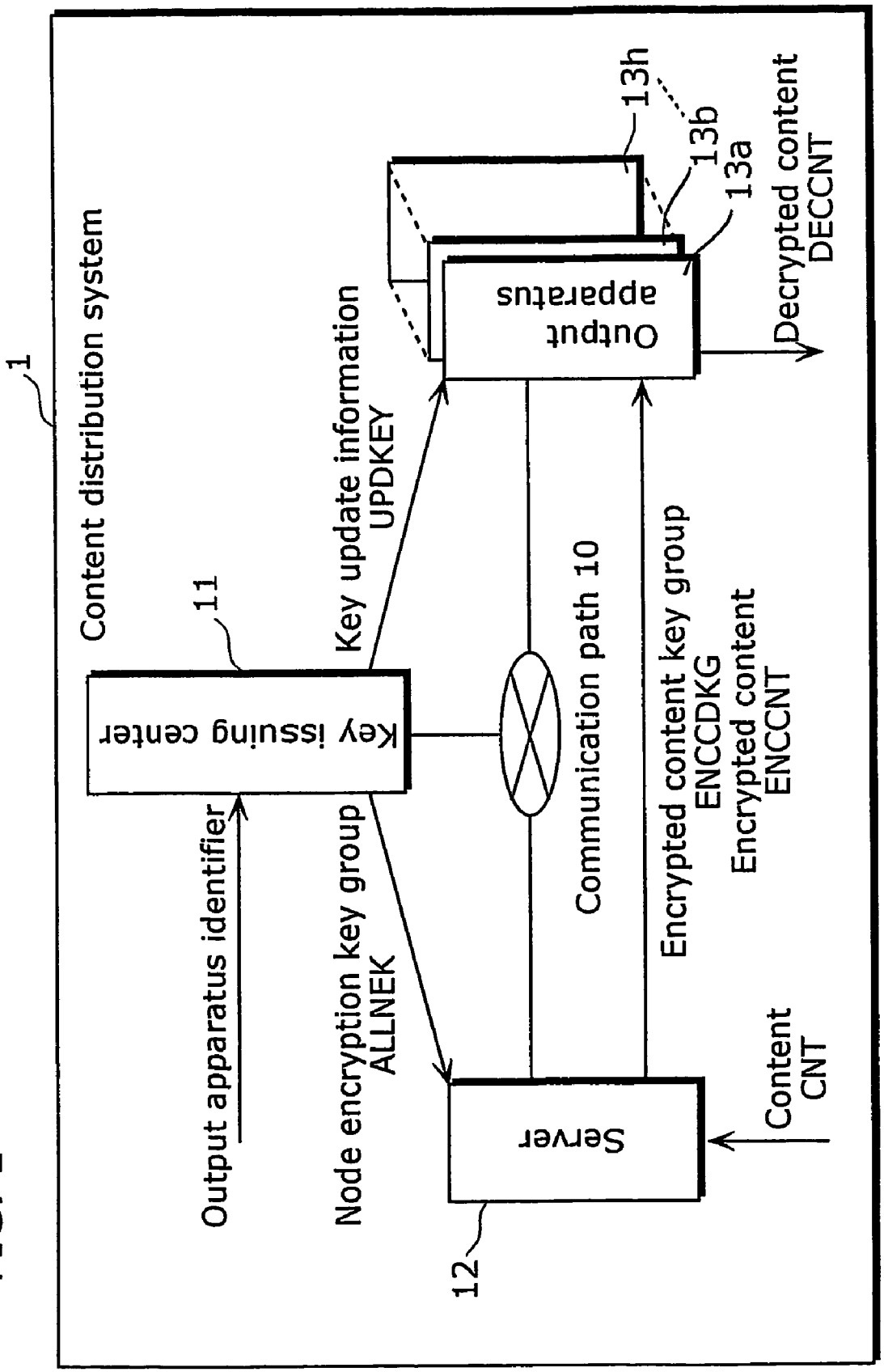
FIG. 1 is a diagram showing an overview of a content distribution system 1 in a first embodiment of the present invention.

In FIG. 1, a communication path 10 is a network such as the Internet for connecting a key issuing center 11, a server 12 and eight output apparatuses 13a to 13h (which are to be described later) to each other. Here, each of all the pairs of the key issuing center 11 and the output apparatuses 13a to 13h is assigned one individual key which is previously shared by each pair. For example, the key issuing center 11 previously shares an individual key IKa with the output apparatus 13a, an individual key IKb with the output apparatus 13b, . . . and an individual key IKh with the output apparatus 13h.

Here is a description of the operations of respective constituents of the content distribution system 1. First, a method of distributing information concerning node encryption keys and node decryption keys to be used by all the output apparatuses 13a to 13h to obtain a content decryption key.

Figure 2:
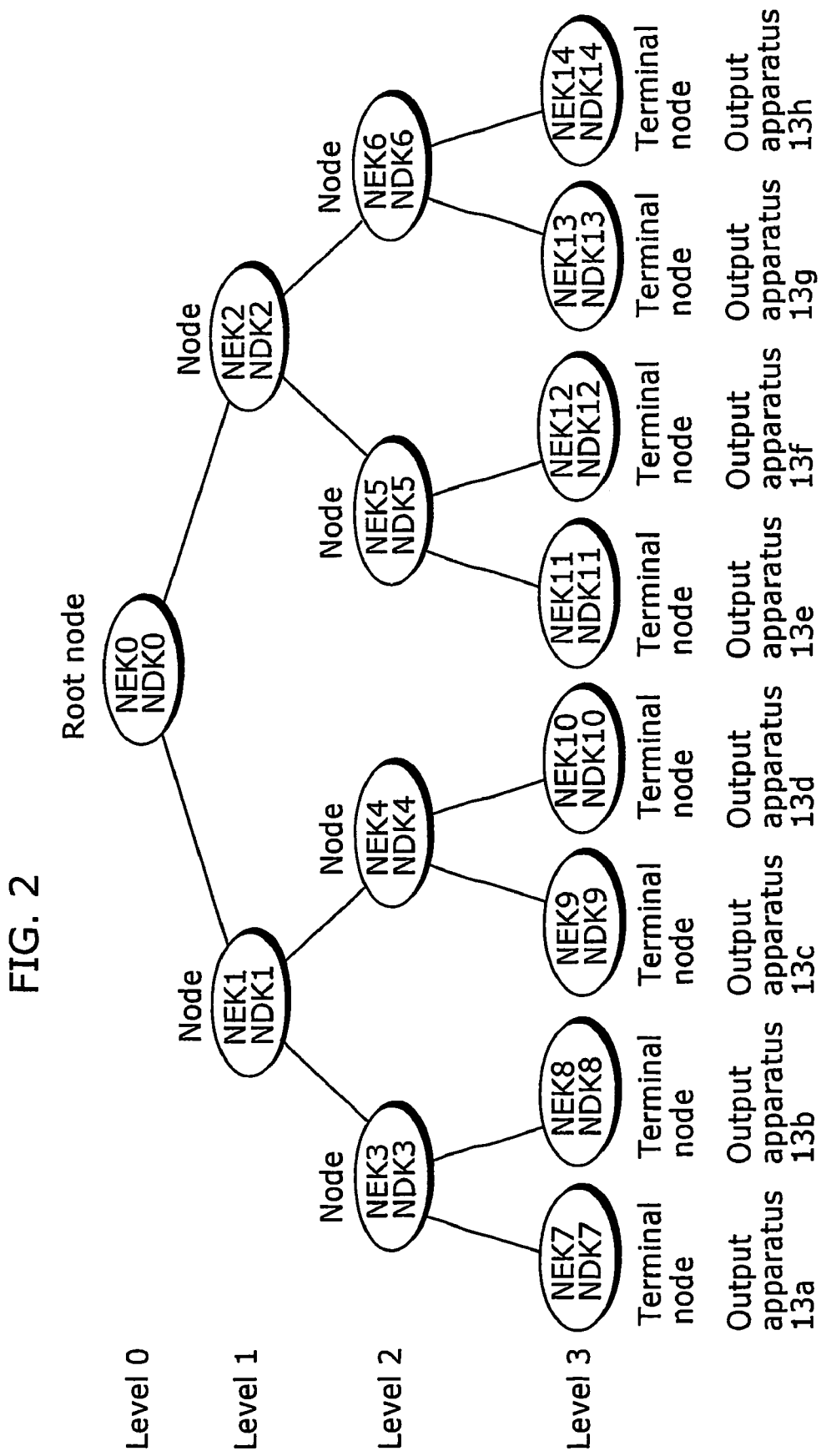
FIG. 2 is a diagram showing one example of a method for setting node encryption keys and node decryption keys in output apparatuses 13a to 13h.
Figure 3:
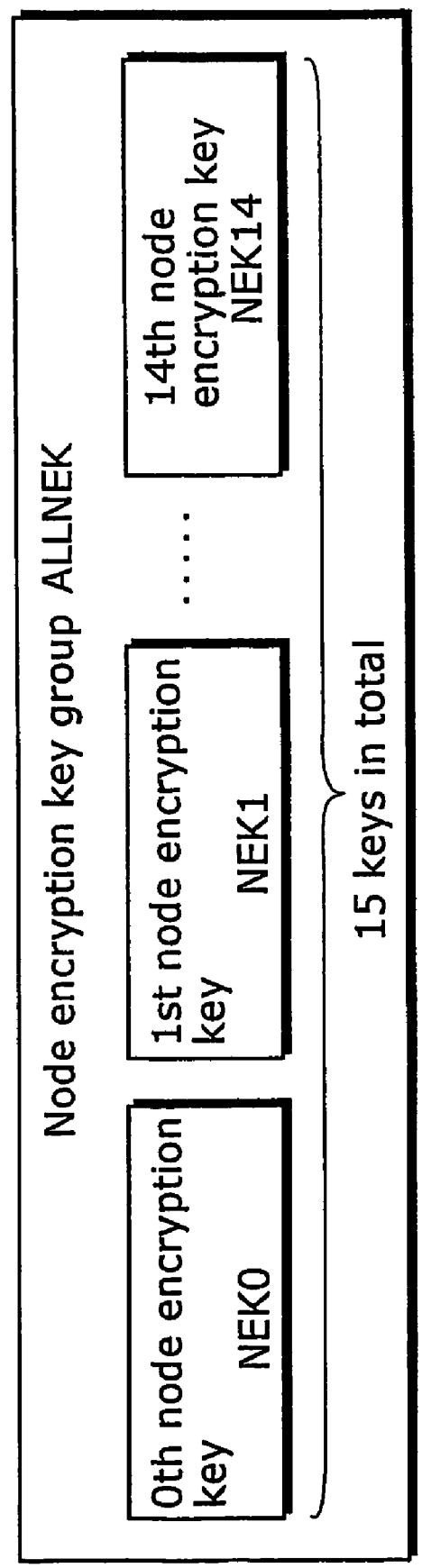
FIG. 3 is a diagram showing one example of a node encryption key group ALLNEK in the first embodiment of the present invention.

The key issuing center 11 first prepares a binary tree structure with two child nodes for each node and the depth 3 as shown in FIG. 2, and shares it with the server 12. Note that, in the present invention, a tree with N (N is 3 or a larger natural number) children or with the depth M (M is 2 or a larger natural number) may be used, and a plurality of tree structures may also be used. In the tree structure used in the present invention, the depth (or level) of a root node is hereinafter referred to as Level 0, and the depth of a child node of the root node (Level 0) is referred to as Level 1, the depth of a child node of the node of Level 1 is referred to as Level 2, and the depth of a child node of the node of Level 2 is referred to as Level 3. These nodes are referred to as follows: A root node is referred to as the $0^{th}$ node, and the two child nodes of the $0^{th}$ node are referred to as the $1^{st}$ node and the $2^{nd}$ node respectively. The two child nodes of the $1^{st}$ nodes are referred to as the $3^{rd}$ node and the 4th node respectively, and the two child nodes of the $2^{nd}$ node are referred to as the $5^{th}$ node and the $6^{th}$ node respectively. Furthermore, the two child nodes of the $3^{rd}$ node are referred to as the $7^{th}$ node and the $8^{th}$ node, the two child nodes of the $4^{th}$ node are referred to as the $9^{th}$ node and the $10^{th}$ node, the two child nodes of the $5^{th}$ node are referred to as the $11^{th}$ node and the $12^{th}$ node, and the two child nodes of the $6^{th}$ node are referred to as the $13^{th}$ node and the $14_{th}$ node, respectively. In sum, the tree structure used in the present invention consists of 15 nodes in total. A pair of the $0^{th}$ node encryption key NEK0 and the corresponding $0^{th}$ node decryption key NDK0, a pair of the $1^{st}$ node encryption key NEK1 and the corresponding $1^{st}$ node decryption key NDK1, . . . and a pair of the $14^{th}$ node encryption key NEK14 and the corresponding $14^{th}$ node decryption key NDK14 are respectively created on a random basis and set for the 0th node, the $1^{st}$ node, . . . and the $14^{th}$ node respectively. Here, the $0^{th}$ to $14^{th}$ node decryption keys NDK0 to NDK14 shall be the decryption keys corresponding to the $0^{th}$ to $14^{th}$ node encryption keys NEK0 to NEK14 respectively, and the $0^{th}$ to $14^{th}$ node decryption keys NDK0 to NDK14 are set to have values different from each other. The key issuing center 11 transmits, to the server 12, a node encryption key group ALLNEK=NEK0∥NEK1∥ . . . ∥NEK14 that consists of the $0^{th}$ node encryption key to the $14^{th}$ node encryption key 14 NEK0 to NEK14 as shown in FIG. 3. Then, it associates the output apparatuses 13a to 13h one to one with the terminal nodes (leaves) of Level 3. Note that a plurality of output apparatuses may be associated with one terminal node. Four node decryption keys are assigned to each of the output apparatuses 13a to 13h because there are four nodes from the terminal node toward the root node. For example, in the case of the tree structure of FIG. 2, the $0^{th}$, $1^{st}$, $3^{rd}$ and $7^{th}$ node decryption keys NDK0, NDK1, NDK3 and NDK7 are assigned to the output apparatus 13a. In the same manner, the $0^{th}$, $2^{nd}$, $5^{th}$ and $12^{th}$ node decryption keys NDK0, NDK2, NDK5 and NDK12 are assigned to the output apparatus 13f. After that, the key issuing center 11 encrypts a concatenation of the four node decryption keys assigned to each of the output apparatuses 13a to 13h using each of the individual keys IKa to IKh which are previously shared between key issuing center 11 and respective output apparatuses. For example, a cipher text Enc (IKa, NDK0||NDK1||NDK3||NDK7) and a cipher text Enc (IKf, NDK0||NDK2||NDK5||NDK12) are created for the output apparatus 13a and the output apparatus 13f respectively. Then, the key issuing center 11 distributes, to a plurality of output apparatuses 13a to 13h, a concatenation of respective cipher texts as key update information UPDKEY=Enc (IKa, NDK0||NDK1||1NDK3||NDK7)|| . . . ||Enc (IKh, NDK0||NDK2||NDK6||NDK14).

Next, the operations of the server 12 when it distributes a content decryption key CDK to the output apparatuses 13a to 13h are explained. First, the server 12 generates, on a random basis, a content encryption key CEK and a corresponding content decryption key CDK to be used for encrypting and decrypting a content CNT. Then, it selects a plurality of node encryption keys to be used for encrypting the content decryption key CDK, from among the node encryption key group in the following manner. First, it selects, on a random basis, one of the node encryption keys (NEK7 to NEK14) associated with the terminal nodes of the tree structure. Here, it should be noted that the terminal node (one of the $7^{th}$ to $14^{th}$ nodes) to be selected varies every time the content encryption key CEK and the content decryption key CDK are updated. The server 12 repeats selecting a node encryption key that corresponds to a node decryption key held-by any of the output apparatuses 13a to 13h which has not been assigned the node decryption key that corresponds to the selected node encryption key. Note that it may repeat the selection until no more node decryption keys that correspond to the selected node encryption keys can be assigned to any of the output apparatuses 13a to 13h. According to the above-mentioned method, the server 12 selects a plurality of node encryption keys to be used for encrypting the content decryption key CDK from among the node encryption key group. For example, since the output apparatus 13a holds the $7^{th}$ node decryption key NDK7, the output apparatus 13b holds the $8^{th}$ node decryption key NDK8, the output apparatuses 13c and 13d hold the $4^{th}$ node decryption key NDK4, and the output apparatuses 13e to 13h hold the $2^{nd}$ node decryption key NDK2, the server 12 can select the $2^{nd}$, $4^{th}$, $7^{th}$ and $8^{th}$ node encryption keys NEK2, NEK4, NEK7 and NEK8. The content decryption key CDK is encrypted using each of these selected node encryption keys. For example, in the above-mentioned example, cipher texts are Enc (NEK2, CDK), Enc (NEK4, CDK), Enc (NEK7, CDK) and Enc (NEK8, CDK). Then, the server 12 transmits the encrypted content key group ENCCDKG that consists of the encrypted content decryption keys CDK to the output apparatuses 13a to 13h. For example, in the above-mentioned example, the encrypted content key group is ENCCDKG=Enc (NEK2, CDK)||Enc (NEK4, CDK)||Enc (NEK7, CDK)||Enc (NEK8, CDK). Each of the output apparatuses 13a to 13h searches, within the received encrypted content key group ENCCDKG, for the cipher text that corresponds to any of the node decryption keys from among the assigned node decryption key group held by itself, decrypts the cipher text, and obtains the content decryption key CDK. For example, in the case of the tree structure as shown in FIG. 2, since the output apparatus 13a holds the $7^{th}$ node decryption key NDK 7, it decrypts the cipher text Enc (NEK7, CDK) created for the content decryption key CDK based on the $7^{th}$ node encryption key NEK 7, and obtains the content decryption key CDK.

Here, it is assumed that the server 12 updates a content encryption key CEK and a corresponding content decryption key CDK, and it also updates a plurality of node encryption keys to be selected from among a node encryption key group to be used for encrypting the content decryption key CDK.

Next, the operations of the server 12 when distributing a content to the output apparatuses 13a to 13h are explained. The server 12 encrypts the content CNT based on the content encryption key CEK, and distributes the encrypted content ENCCNT=Enc (CEK, CNT) to the plurality of output apparatuses 13a to 13h. The plurality of output apparatuses 13a to 13h receive the encrypted content ENCCNT, decrypt the encrypted content ENCCNT based on the content decryption key CDK, and output the decrypted content DECCNT to the outside.

Note that in the content distribution system 1 in the present embodiment, it is possible for the key issuing center 11 to revoke an output apparatus having a specific individual key so that it cannot decrypt a content CNT. This is feasible by the following method. Here, the case where the output apparatus 13a is revoked is explained. First, the key issuing center 11 receives, from outside, an output apparatus identifier AIDa which identifies the output apparatus 13a, newly generates all the node encryption keys, and transmits a node encryption key group that consists of all the generated node encryption keys (NEK0 to NEK14) to the server 12. After that, it assigns four node decryption keys among all of the node decryption keys (NDK0 to NDK14) individually to the output apparatuses 13b to 13h other than the output apparatus 13a, and creates an assigned node decryption key group (ANDKGb to ANDKGh) that consists of the assigned four node decryption keys. Then, based on each of the individual keys Ikb to IKh held respectively by the output apparatuses 13b to 13h other than the output apparatus 13a corresponding to the output apparatus identifier AIDa, the key issuing center 11 encrypts each of the assigned node decryption key groups ANDKGb to NDKGh, and distributes, to the plurality of output apparatuses 13a to 13h, the value of a concatenation of the cipher texts as an encrypted content key group ENCCDKG. Accordingly, the output apparatus 13a that corresponds to the output apparatus identifier AIDa inputted to the key issuing center 11 cannot obtain the newly generated four node decryption keys because there is no cipher text of the assigned node decryption key group that corresponds to the individual key IKa in the encrypted content key group ENCCDKG, and as a result, cannot generate the content decryption key CDK. In other words, since the output apparatus 13a cannot decrypt the encrypted content ENCCNT=Enc (CDK, CNT), the revocation of the output apparatus 13a can be achieved. Here, the cases of revoking the output apparatuses 13b to 13h other than the output apparatus 13a are similar to the case of revoking the output apparatus 13a. However, they differ from the case of the output apparatus 13a in that the output apparatuses 13b to 13h encrypt each of the assigned node decryption keys using different individual keys because respective output apparatuses 13a to 13h have individual keys different from each other. As such, the key issuing center 11 can revoke an output apparatus having a specific individual key.

This is a summary of the present embodiment. Hereafter, the content distribution system 1 as an embodiment of the content distribution system of the present invention is explained in detail. Here, the constituents of the content distribution system 1 are also explained in detail.

<Structure of Content Distribution System 1>

As shown in FIG. 1, the content distribution system 1 is made up of the communication path 10, the key issuing center 11, the server 12 and the plurality of output apparatuses 13a to 13h.

The key issuing center 11 transmits a node encryption key group ALLNEK to be used for encrypting a content decryption key CDK to the server 12. It also assigns any set of four node decryption keys from among the node decryption keys (NDK0 to NDK14) to be used when obtaining the content decryption key CDK, using the tree structure as shown in FIG. 2. Then, the key issuing center 11 encrypts a concatenation of the four node decryption keys assigned to each of the output apparatuses 13a to 13h, using the individual key IKa to IKh held by each output apparatus, and distributes the value of a concatenation of the cipher texts, as key update information UPDKEY, to the plurality of output apparatuses 13a to 13h. Each of the output apparatuses 13a to 13h obtains the cipher text that corresponds to the individual key held by itself, from among the key update information UPDKEY, decrypts the cipher text using its own individual key, and obtains the four node decryption keys assigned to the output apparatus itself. The server 12 creates a content encryption key CEK and a content decryption key CDK for encrypting and decrypting a content CNT, and selects a plurality of node encryption keys to be used for encrypting the content decryption key CDK from among a node encryption key group by the following method. First, the server 12 selects, on a random basis, one node encryption key associated with a terminal node of a tree structure from among NEK7 to NEK14. Here, it should be noted that a terminal node to be selected (from among the $7^{th}$ node to $14^{th}$ node) varies every time the content encryption key CEK and the content decryption key CDK are updated. Then, the server 12 repeats selecting a node encryption key that corresponds to a node decryption key held by any of the output apparatuses 13a to 13h which are not assigned the node decryption key that corresponds to the selected node encryption key. According to the above method, the server 12 selects a plurality of node encryption keys to be used for encrypting a content decryption key CDK from among a node encryption key group. Then, it encrypts the content decryption key CDK using each of the selected node encryption keys, and transmits a concatenation of the cipher texts, as an encrypted content key group ENCCDKG, to the output apparatuses 13a to 13h. Each of the output apparatuses 13a to 13h decrypts the cipher text of the corresponding content decryption key among the encrypted content key group ENCCDKG, using any of the four node decryption keys among the assigned node decryption keys held by itself, and obtains the content decryption key CDK. The server 12 encrypts the content CNT, distributes it as an encrypted content ENCCNT=Enc (CEK, CNT), to the output apparatuses 13a to 13h. Each of the output apparatuses 13a to 13h decrypts the received encrypted content ENCCNT based on the content decryption key CDK, and outputs the decrypted content DECCNT to the outside.

Hereafter, these constituents are explained in detail. They are explained in the following order with references to diagrams: i) Structure of Communication Path 10, ii) Structure and Operations of Key Issuing Center 11, iii) Structure and Operations of Server 12, and iv) Structure and Operations of Output Apparatuses 13a to 13h.

<Structure of Communication Path 10>

The communication path is, for example, a network such as the Internet, a telephone line and a private line.

<Structure of Key Issuing Center 11>

Figure 4:
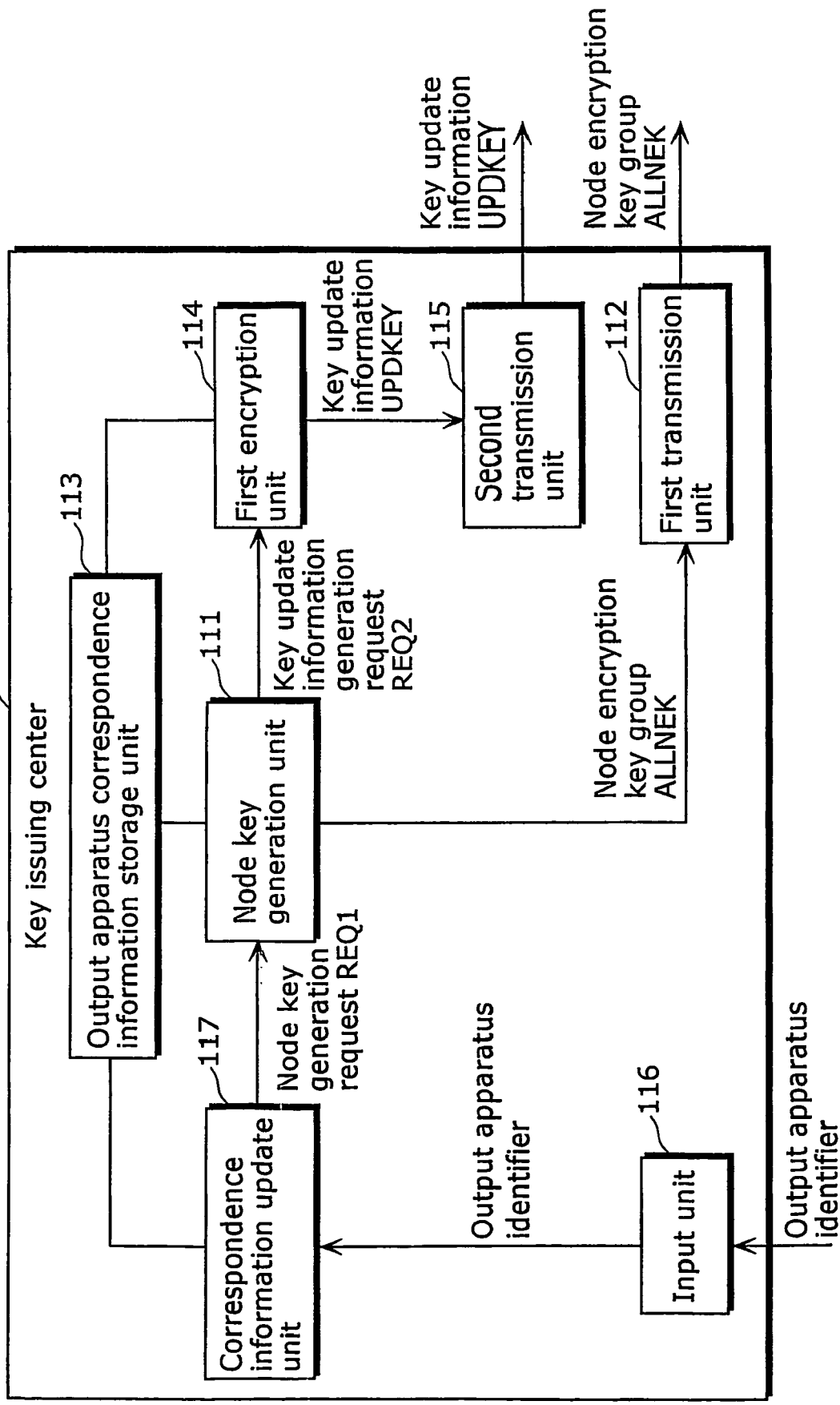
FIG. 4 is a block diagram showing a structure example of a key issuing center 11 in the first embodiment of the present invention.

As shown in FIG. 4, the key issuing center 11 is made up of a node key generation unit 111, a first transmission unit 112, an output apparatus correspondence information storage unit 113, a first encryption unit 114, a second transmission unit 115, an input unit 116, and a correspondence information update unit 117. (1) Node Key Generation Unit 111

Figure 5:
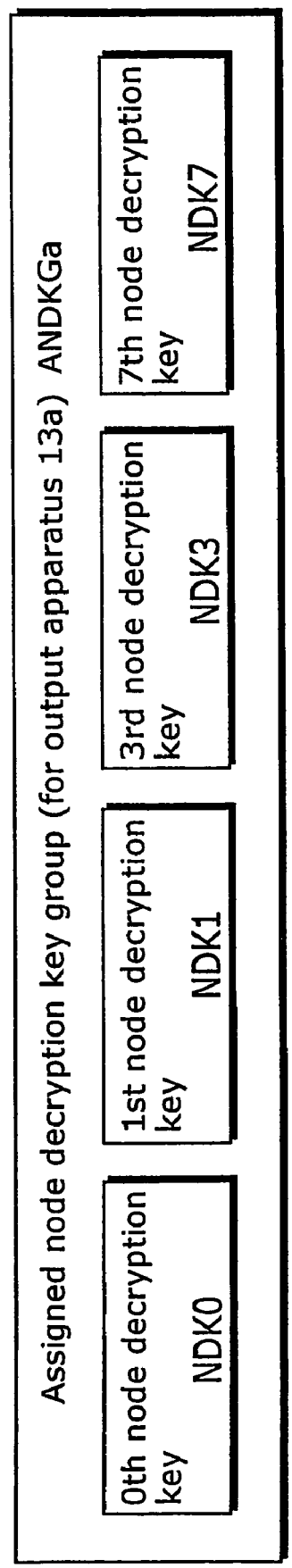
FIG. 5 is a diagram showing one example of an assigned node decryption key group ANDKGa in the first embodiment of the present invention.
Figure 6:
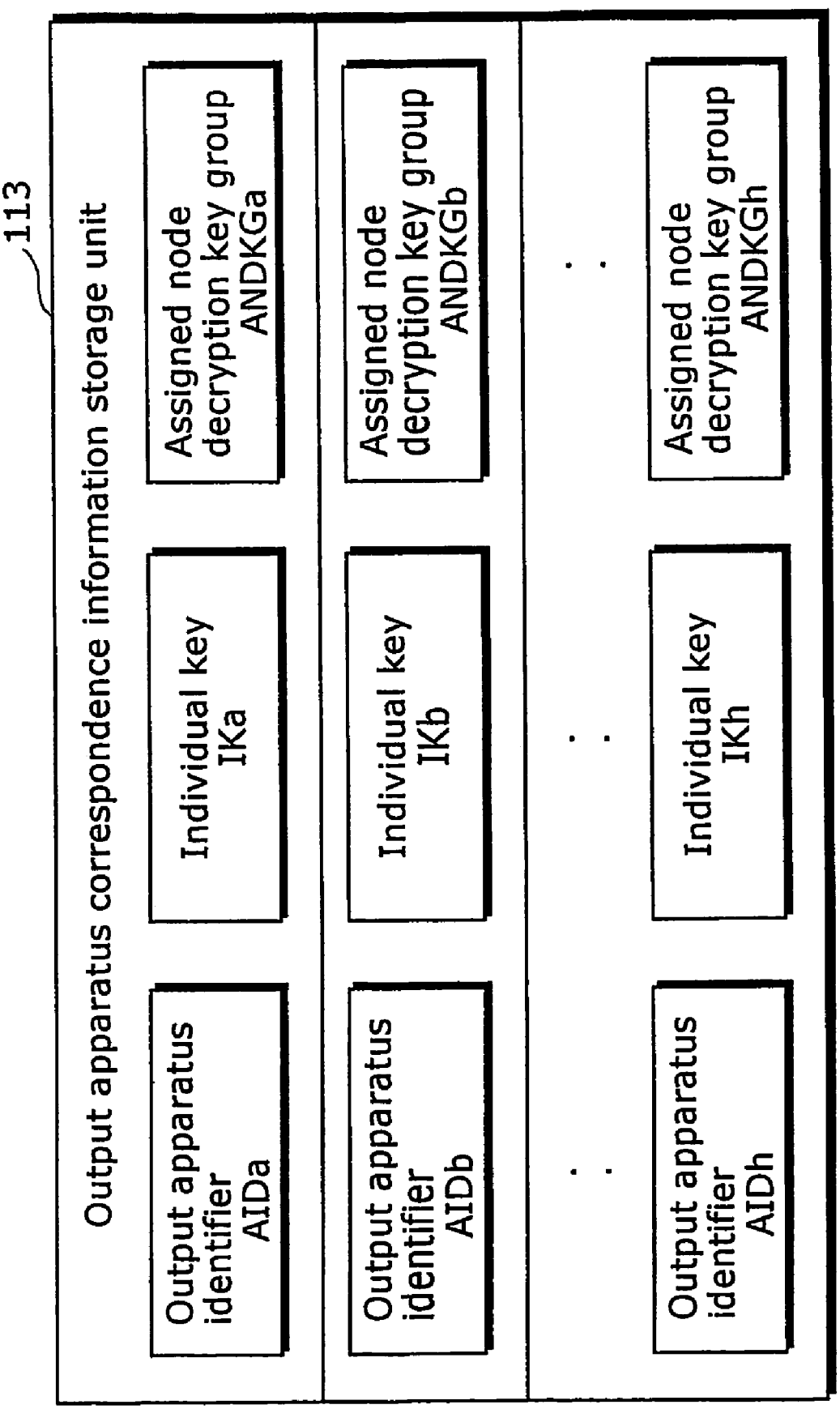
FIG. 6 is a diagram showing a structure example of an output apparatus correspondence information storage unit 113 in the first embodiment of the present invention.

Node key update conditions are previously given to the node key generation unit 111. When the conditions are satisfied, or the node key generation unit 111 receives a node key generation request REQ1 from the correspondence information update unit 117 to be described later, or the key issuing center 11 starts its operation, the node key generation unit 111 first creates 15 pairs of the $0^{th}$ node encryption key NEK0 and the corresponding $0^{th}$ node decryption key NDK0, the $1^{st}$ node encryption key NEK1 and the corresponding $1^{st}$ node decryption key NDK1, . . . the $14^{th}$ node encryption key NEK14 and the corresponding $14^{th}$ node decryption key NDK14, on a random basis. Here, the node encryption key and the node decryption key are, for example, are 128-bit AES keys respectively. The key generation unit 111 creates a node encryption key group ALLNEK=NEK0∥NEK1∥ . . . ∥NEK14 that is a concatenation of the node encryption keys NEK0 to NEK14 as shown in FIG. 3, and outputs the node encryption key group ALLNEK to the first transmission unit 112. Then, in the case of the tree structure as shown in FIG. 2, the node key generation unit 111 associates the output apparatuses 13a to 13h one to one with eight terminal nodes ($7^{th}$ to $14^{th}$ nodes), and assigns four node decryption keys to each of the output apparatuses 13a to 13h because there are four nodes from the terminal node toward the root node. For example, in the case of the tree structure of FIG. 2, the $0^{th}$, $1^{st}$, $3^{rd}$ and $7^{th}$ node decryption keys NDK0, NDK1, NDK3 and NDK7 are assigned to the output apparatus 13a. In the same manner, the $0^{th}$, $2^{nd}$, $5^{th}$ and $12^{th}$ node decryption keys NDK0, NDK2, NDK5 and NDK12 are assigned to the output apparatus 13f. After that, the node key generation unit 111 creates assigned node decryption key groups ANDKGa to ANDKGh each of which consists of four node decryption keys assigned to each of the output apparatuses 13a to 13h. For example, as shown in FIG. 5, an assigned node decryption key group for the output apparatus 13a is ANDKGa=NDK0∥NDK1∥NDK3∥NDK7, and an assigned node decryption key group for the output apparatus 13f is ANDKGf=NDK0∥DK2∥NDK5∥NDK12). Then, the node key generation unit 111 associates the generated assigned node decryption key groups ANDKGa to ANDKGh one to one with the output apparatus identifiers AIDa to AIDh, and stores them into the output apparatus correspondence information storage unit 113 as shown in FIG. 6, and finally outputs a key update information generation request REQ2 to the first encryption unit 114. Note that the node key update conditions which are previously given to the node key generation unit 111 are, for example, "every one year"and the like. These conditions can be realized by incorporating a counter into the node key update unit 111.

(2) First Transmission Unit 112

The first transmission unit 112 transmits the node encryption key group ALLNEK received from the node key generation unit 111 to the sever 12 via the communication path 10.

(3) Output Apparatus Correspondence Information Storage Unit 113

As shown in FIG. 6, the output apparatus correspondence information storage unit 113 holds the output apparatus identifiers AIDa to AIDh for identifying the plurality of output apparatuses 13a to 13h, the individual keys IKa to IKh and the assigned node decryption key groups ANDKGa to ANDKGh that are previously given to respective output apparatuses 13a to 13h. For example, FIG. 6 shows that the output apparatus 13a corresponding to the output apparatus identifier AIDa holds the individual key IKa and the assigned node decryption key group ANDKGa, the output apparatus 13b corresponding to the output apparatus identifier AIDb holds the individual key IKb and the assigned node decryption key group ANDKGb, and the output apparatus 13h corresponding to the output apparatus identifier AIDh holds the individual key IKh and the assigned node decryption key group ANDKGh, respectively. The output apparatus correspondence information storage unit 113 can be accessed from the node key generation unit 111, the first encryption unit 114 and the correspondence information update unit 117.

(4) First Encryption Unit 114

Figure 7:
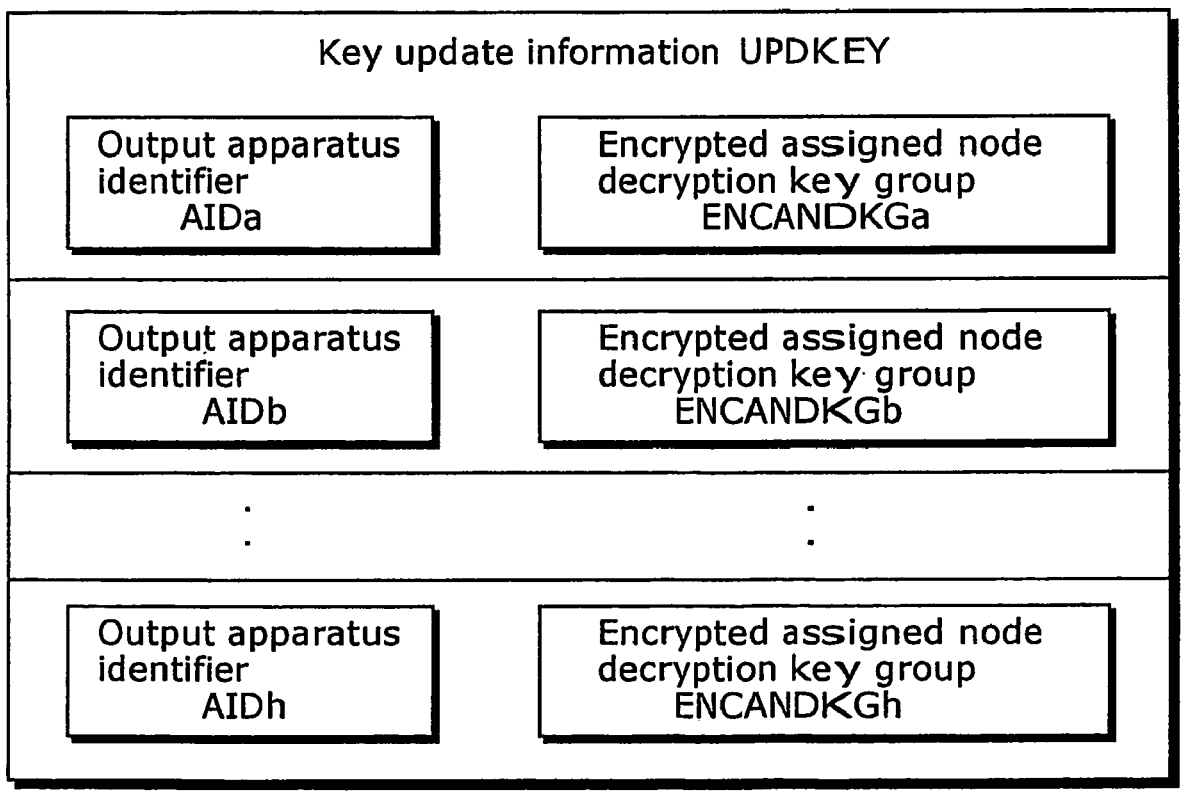
FIG. 7 is a diagram showing one example of key update information UPDKEY in the first embodiment of the present invention.

The first encryption unit 114, in the case of receiving the key update information generation request REQ2 from the node key generation unit 111, accesses the output apparatus correspondence information storage unit 113, and obtains all of the output apparatus identifiers AIDa to AIDh, the individual keys IKa to IKh and the assigned node decryption key groups ANDKGa to ANDKGh. Then, the first encryption unit 114, firstly for the output apparatus identifier AIDa, encrypts the assigned node decryption key group ANDKGa based on the corresponding individual key IKa, and associates the cipher text, as an encrypted assigned node decryption key group ENCANDKGa=Enc (IKa, ANDKGa), with the output apparatus identifier AIDa. Then, similarly for other output apparatus identifiers AIDb to AIDh, it encrypts the assigned node decryption key groups based on the corresponding individual keys and respectively associates the cipher texts Enc (Ikb, ANDKGb), . . . and Enc (Ikh, ANDKGh), as ENCANDKGb, . . . and ENCANDKGh, with the output apparatus identifiers AIDb to AIDh. Then, the first encryption unit 114 generates key update information UPDKEY={AIDa, ENCANDKGa}||{AIDb, ENCANDKGb} . . . ||{AIDh, ENCANDKGh}} which is made up of the apparatus identifiers AIDa to AIDh and the encrypted assigned node decryption key groups ENCANDKGa to ENCANDKGh as shown in FIG. 7, and outputs the key update information UPDKEY to the second transmission unit 115. Here, an encryption algorithm to be used for encrypting the assigned node decryption key group is, for example, an AES or DES block cipher algorithm, and the algorithm same as the decryption algorithm used in each of the second decryption units 138a of the output apparatuses 13a to 13h is to be used.

(5) Second Transmission Unit 115

The second transmission unit 115, in the case of receiving the key update information UPDKEY from the first encryption unit 114, distributes the received key update information UPDKEY to the plurality of output apparatuses 13a to 13h via the communication path 10.

(6) Input Unit 116

The input unit 116 can receive, from outside, one of the output apparatus identifiers AIDa to AIDh which identify the output apparatuses 13a to 13h. When it receives, from outside, one of the output apparatus identifiers AIDa to AIDh, it outputs the received output apparatus identifier to the correspondence information update unit 117. Note that, the input unit 116 is used by the key issuing center 11 for judging which one of the output apparatuses should be revoked when revoking an output apparatus having a specific individual key. Therefore, when it does not revoke an output apparatus, the key issuing center 11 does not need to include the input unit 117.

(7) Correspondence Information Update Unit 117

Figure 8:
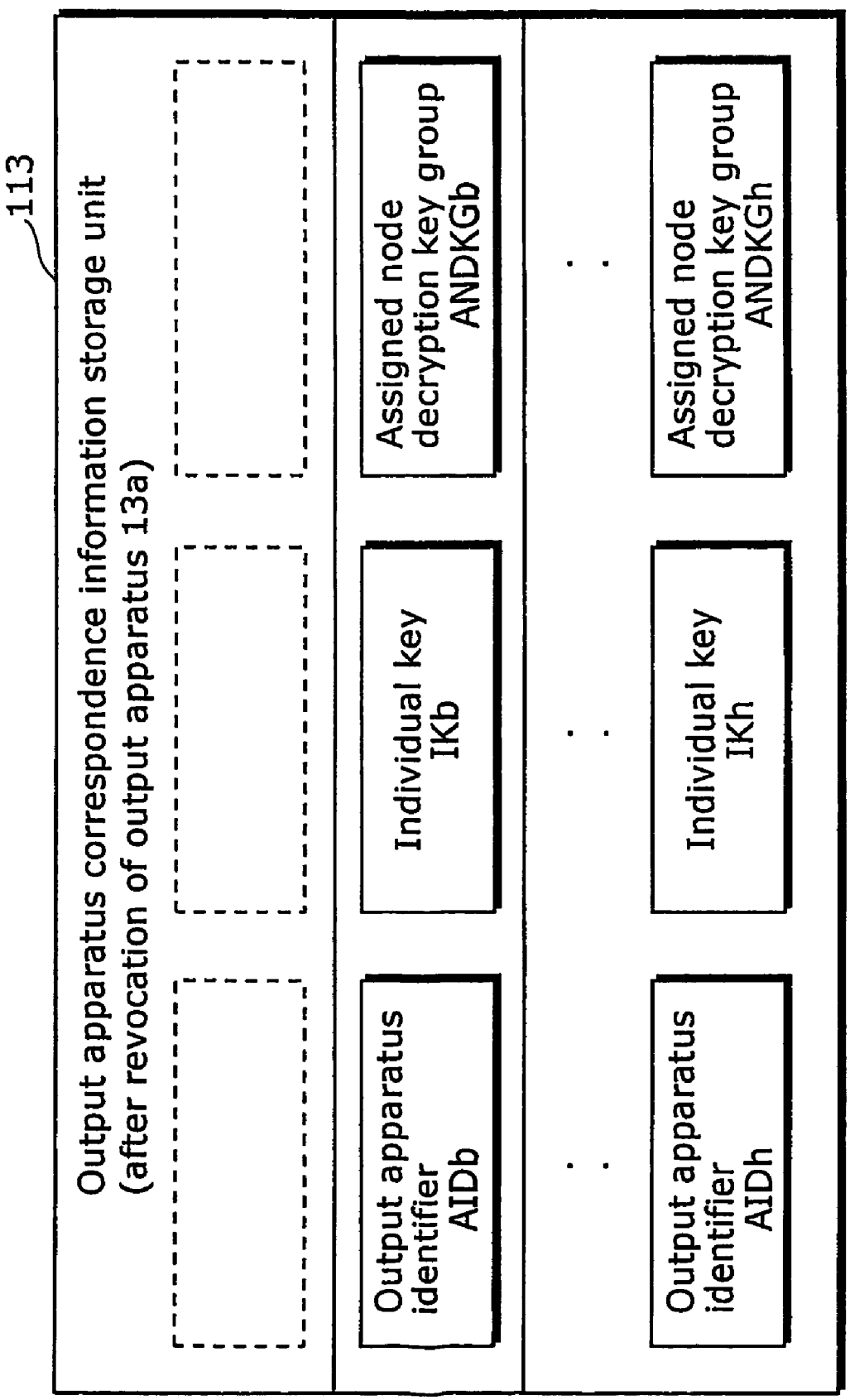
FIG. 8 is a diagram showing a structure example of the output apparatus correspondence information storage unit 113 after revoking the output apparatus 13a in the first embodiment of the present invention.

The correspondence information update unit 117, in the case of receiving one of the output apparatus identifiers AIDa to AIDh from the input unit 116, accesses the output apparatus correspondence information storage unit 113 as shown in FIG. 6, and deletes, from the output apparatus correspondence information storage unit 113, the received output apparatus identifier, and the individual key and the assigned node decryption key group that correspond to the output apparatus identifier. For example, when the correspondence information update unit 117 receives the output apparatus identifier AIDa, it deletes the corresponding output apparatus identifier AIDa, individual key IKa and assigned node decryption key group ANDKGa from the output apparatus correspondence information storage unit 113 as shown in FIG. 6, and as a result, the output apparatus correspondence information storage unit 113 is updated to what FIG. 8 shows. After the deletion, the correspondence information update unit 117 outputs the node key generation request REQ1 to the node key generation unit 111. Note that the correspondence information update unit 117 is used by the key issuing center 11 for revoking an output apparatus having a specific individual key. Therefore, when the key issuing center 11 does not revoke an output apparatus, the key issuing center 11 does not need to include the correspondence information update unit 117.

<Operations of Key Issuing Center 11>

Figure 9:
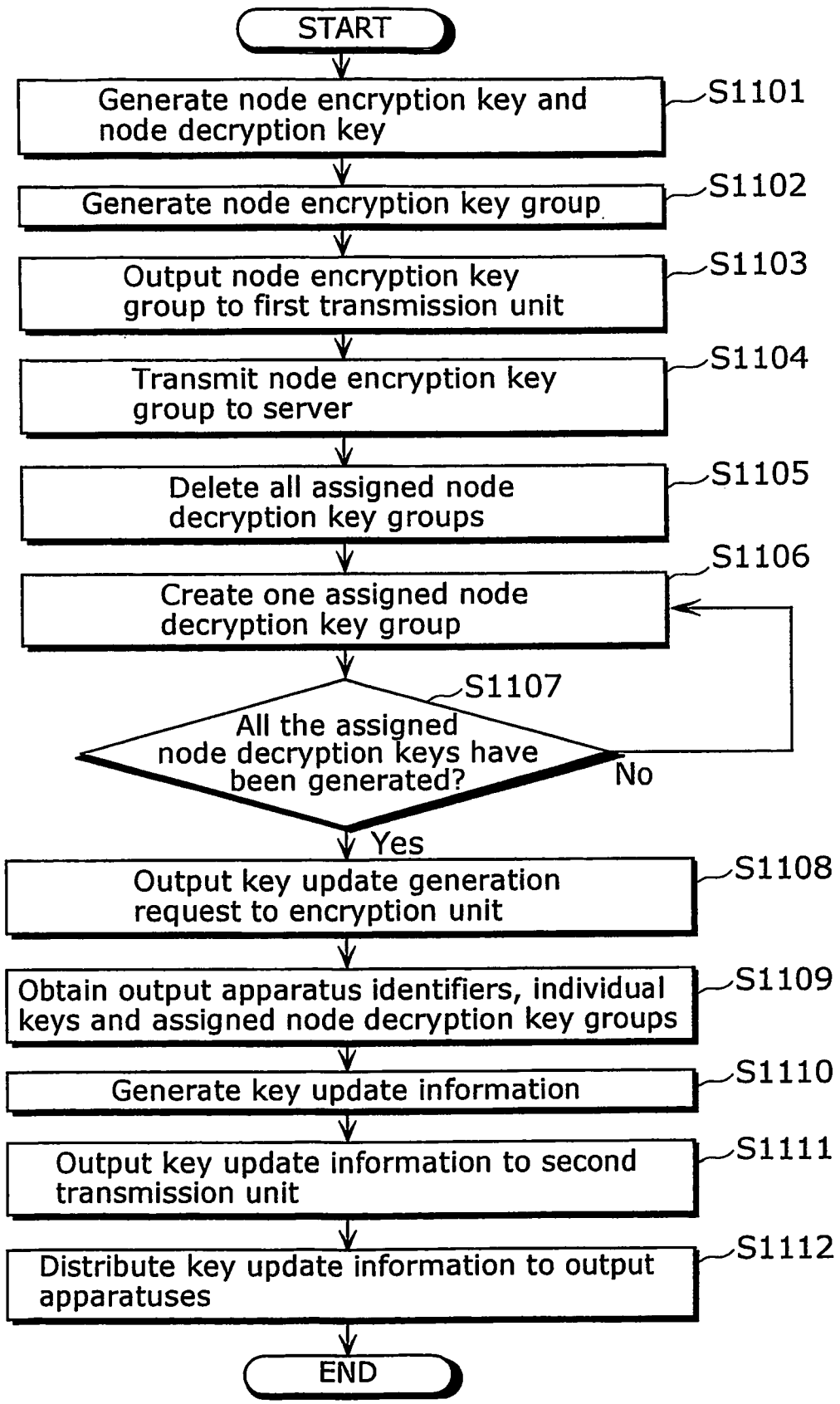
FIG. 9 is a flowchart of processes in which the key issuing center 11 distributes a node encryption key and a node decryption key.
Figure 10:
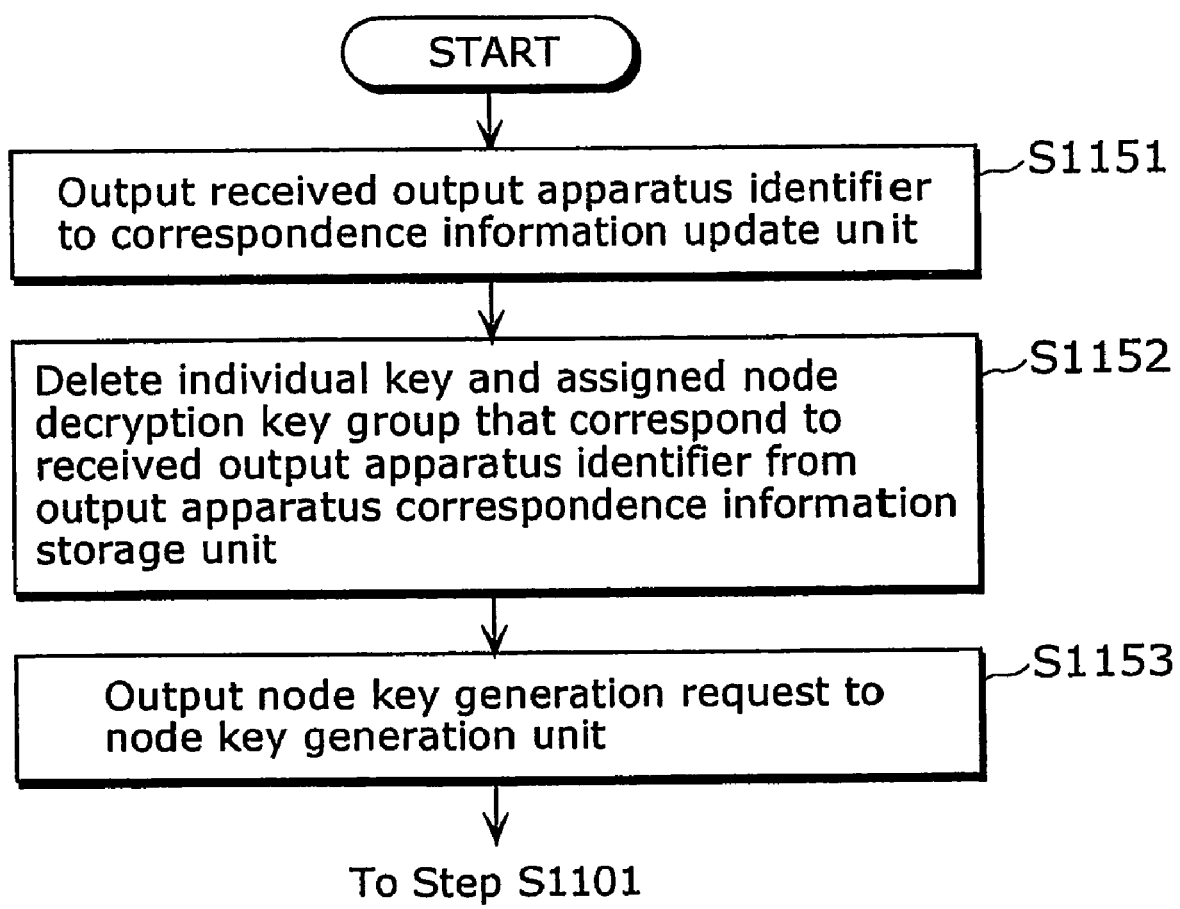
FIG. 10 is a flowchart of processes in which the key issuing center 11 revokes the output apparatus 13a in the first embodiment of the present invention.

In the above, the structure of the key issuing center 11 is explained. Here, the operations of the key issuing center 11 are explained. First, the operations for updating a plurality of node encryption keys and node decryption keys when previously given node key update conditions are satisfied, the key issuing center 11 starts its operations, or the like, are explained using a flowchart shown in FIG. 9. It is possible to add a function for revoking an output apparatus having a specific individual key to the key issuing center 11 by including the input unit 116 and the correspondence information update unit 117 therein qas its constituents, but here, the operations for revoking the output apparatus 13a are explained, as a specific example, using a flowchart shown in FIG. 10.

<<Operation When Updating Node Encryption Key and Node Decryption Key>>

The node key generation unit 111 generates fifteen pairs of the $0^{th}$ node encryption key NEK0 to the $14^{th}$ node encryption key NEK14 and the corresponding $0^{th}$ node decryption key NDK0 to the $14^{th}$ node decryption key NDK14 on a random basis (S1101).

The node key generation unit 111 creates a node encryption key group ALLNEK that consists of the fifteen node encryption keys, namely, the $0^{th}$ node encryption key NEK0 to the $14^{th}$ node encryption key NEK14, as shown in FIG. 3 (S1102).

The node key generation unit 111 outputs the node encryption key group ALLNEK to the first transmission unit 112 (S1103).

The first transmission unit 112 transmits the received node encryption key group ALLNEK to the server 12 (S1104).

The node key generation unit 111 deletes all of the assigned node decryption key groups ANDKGa to ANDKGh stored in the output apparatus correspondence information storage unit 113. It also associates the output apparatuses 13a to 13h to respective eight terminal nodes in the previously given tree structure as shown in FIG. 2 (S1105).

The node key generation unit 111 creates an assigned node decryption key group that consists of four node decryption keys toward the root node from the terminal node, with which an output apparatus which has not yet generated the assigned node decryption key group is associated. It associates the assigned node decryption key group with the output apparatus identifier and stores them into the output apparatus correspondence information storage unit 113 (S1106).

If the assigned node decryption key groups ANDKGa to ANDKGh are respectively assigned to all of the output apparatus identifiers AIDa to AIDh stored in the output apparatus correspondence information storage unit 113, the operation moves on to Step S1108. If some of the output apparatus identifiers AIDa to AIDh remain unassigned, the operation returns to Step S1106 (S1107).

The node key generation unit 111 outputs the key update information generation request REQ2 to the first encryption unit 114 (S1108).

The first encryption unit 114 which received the key update information generation request REQ2 accesses the output apparatus correspondence information storage unit 113 and obtains all of the output apparatus identifiers AIDa to AIDh, individual keys IKa to IKh and assigned node decryption key groups ANDKGa to ANDKGh (S1109).

The encryption unit 115 encrypts each of the assigned node decryption key groups ANDKGa to ANDKGh based on each of the individual keys IKa to IKh, and generates key update information UPDKEY that is made up of the encrypted assigned node decryption key groups ENCANDKGa to ENCANDKGh and the output apparatus identifiers AIDa to AIDh respectively corresponding to the individual keys IKa to IKh used for the encryption (S1110).

The first encryption unit 114 outputs the generated key update information UPDKEY to the second transmission unit 115 (S1111).

The second transmission unit 115 receives the key update information UPDKEY, distributes the received key update information UPDKEY to the plurality of output apparatuses 13a to 13h, and terminates the operation (S1112).

<<Operation When Revoking Output Apparatus 13a>>

The input unit 116 outputs the received output apparatus identifier AIDa to the correspondence information update unit 117 (S1151).

The correspondence information update unit 117 deletes the output apparatus identifier AIDa received from the input unit 116, the individual key IKa and the assigned node decryption key group ANDKGa that correspond to the output apparatus identifier AIDa from the output apparatus correspondence information storage unit 113 (S1152).

The correspondence information update unit 117 outputs the node key generation request REQ1 to the node key generation unit 111 and moves on to Step S1101 (S1153).

Note that the operation for revoking any of the output apparatuses 13b to 13h other than the output apparatus 13a is almost same as that for revoking the output apparatus 13a. However, it differs in that the output apparatus identifier, individual key and assigned node decryption key group to be deleted from the output apparatus correspondence information storage unit 113 by the correspondence information update unit 117 varies depending on the output apparatuses 13b to 13h to be revoked.

These are the structure and operations of the key issuing center 11 that is one of the constituents of the content distribution system 1. The explanation of the structure and operations of the server 12 follows.

<Structure of Server 12>

Figure 11:
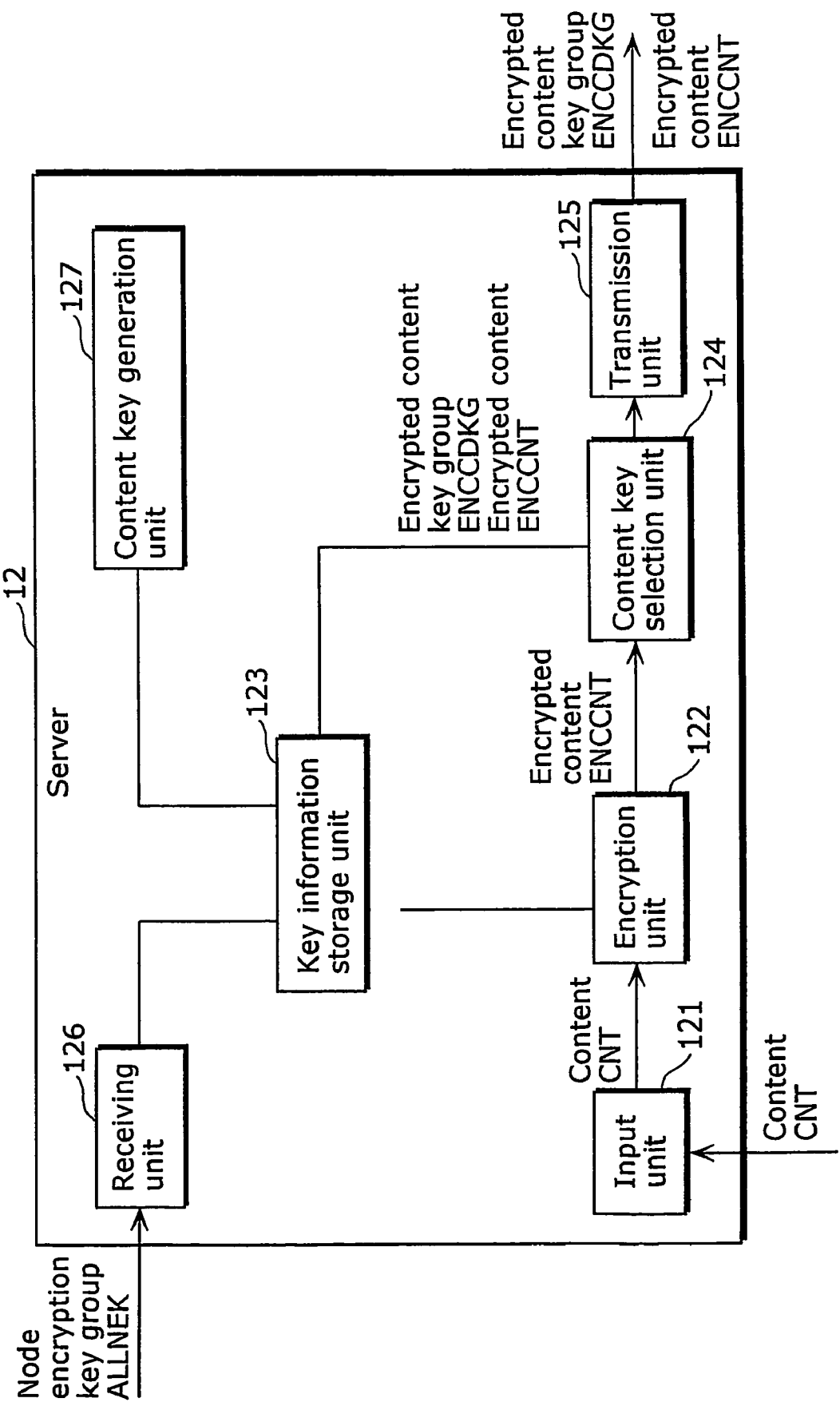
FIG. 11 is a block diagram showing a structure example of a server 12 in the first embodiment of the present invention.

As shown in FIG. 11, the server 12 is made up of an input unit 121, an encryption unit 122, a key information storage unit 123, a content key selection unit 124, a transmission unit 125, a receiving unit 126, and a content key generation unit 127.

(1) Input Unit 121

The input unit 121 can input a content CNT from outside. The content CNT inputted from outside is in a format which can be outputted by the output apparatuses 13a to 13h. For example, it is video data in MPEG format, audio data in MP3 format and the like. When the input unit 121 receives the content CNT from outside, it outputs the received content CNT to the content encryption unit 122 it.

(2) Encryption Unit 122

Figure 12:
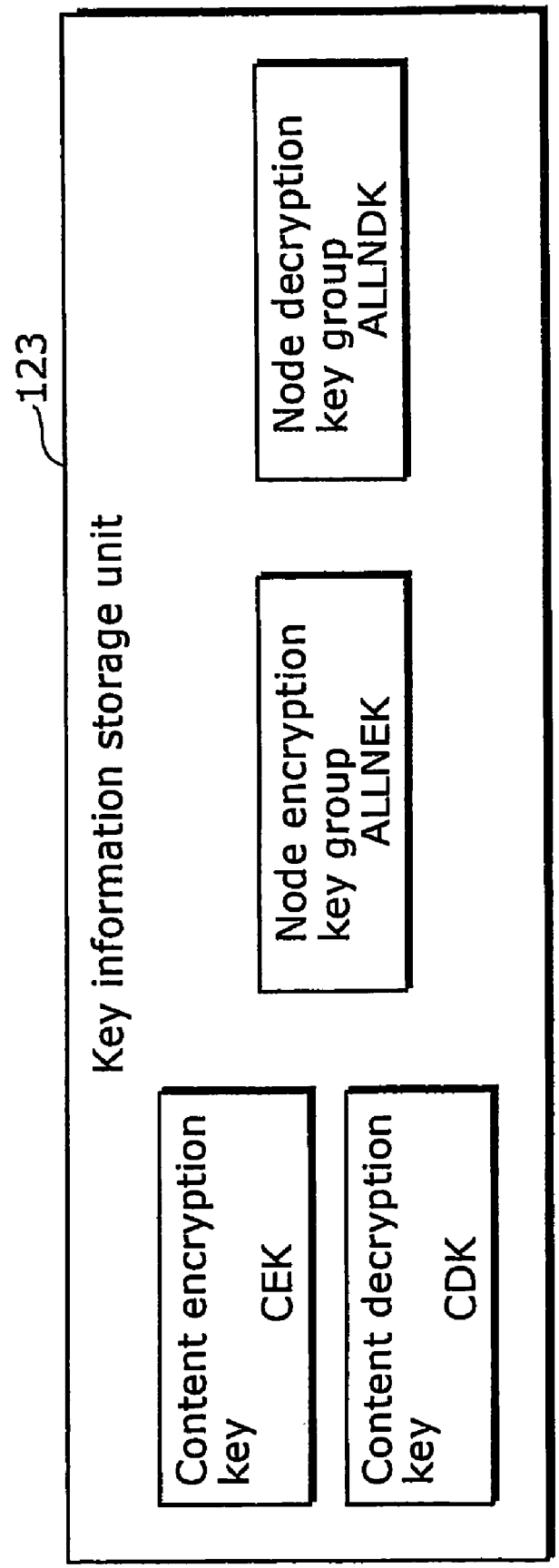
FIG. 12 is a diagram showing a structure example of a key information storage unit 123 in the first embodiment of the present invention.
Figure 13:
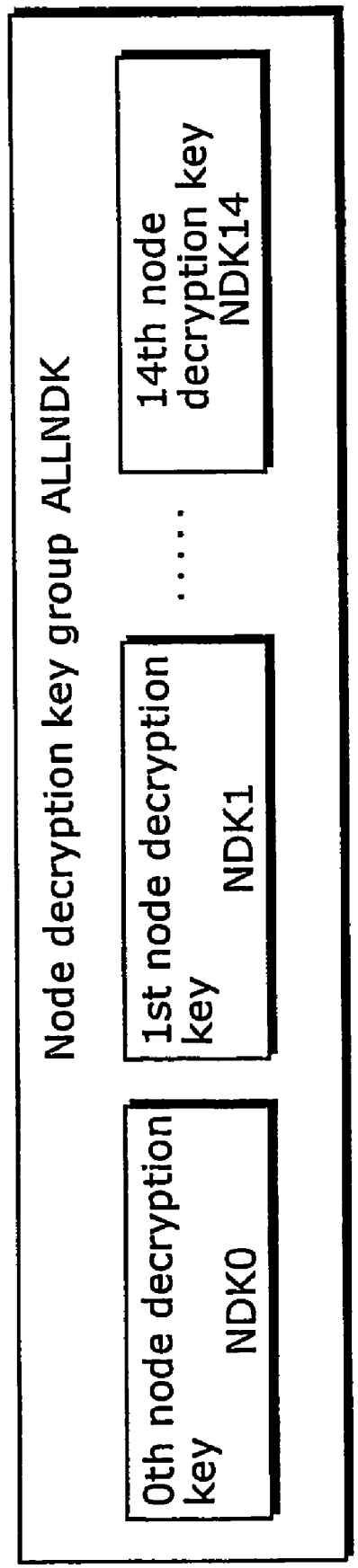
FIG. 13 is a diagram showing a structure example of a node decryption key group ALLNDK in the first embodiment of the present invention.

The encryption unit 122, in the case of receiving the content CNT from the input unit 121, accesses the key information storage unit 123 as shown in FIG. 12 so as to obtain the content encryption key CEK, and encrypts, in sequence, the content CNT inputted from the input unit 121, based on the obtained content encryption key CEK. Here, an encryption algorithm to be used for encrypting the content CNT is, for example, an AES or DES block cipher algorithm and the like, and it uses the same algorithm as a decryption algorithm used for decrypting the encrypted content ENCCNT in the first decryption unit 135 in each of the output apparatuses 13a to 13h which are to be described later. After that, the encryption unit 122 outputs the encrypted content ENCCNT to the content key selection unit 124.

(3) Key Information Storage Unit 123

The key information storage unit 123 holds a content encryption key CEK, a content decryption key CDK, a node encryption key group ALLNEK and a node decryption key group ALLNDK, as shown in FIG. 12.

(4) Content Key Selection Unit 124

Figure 14:
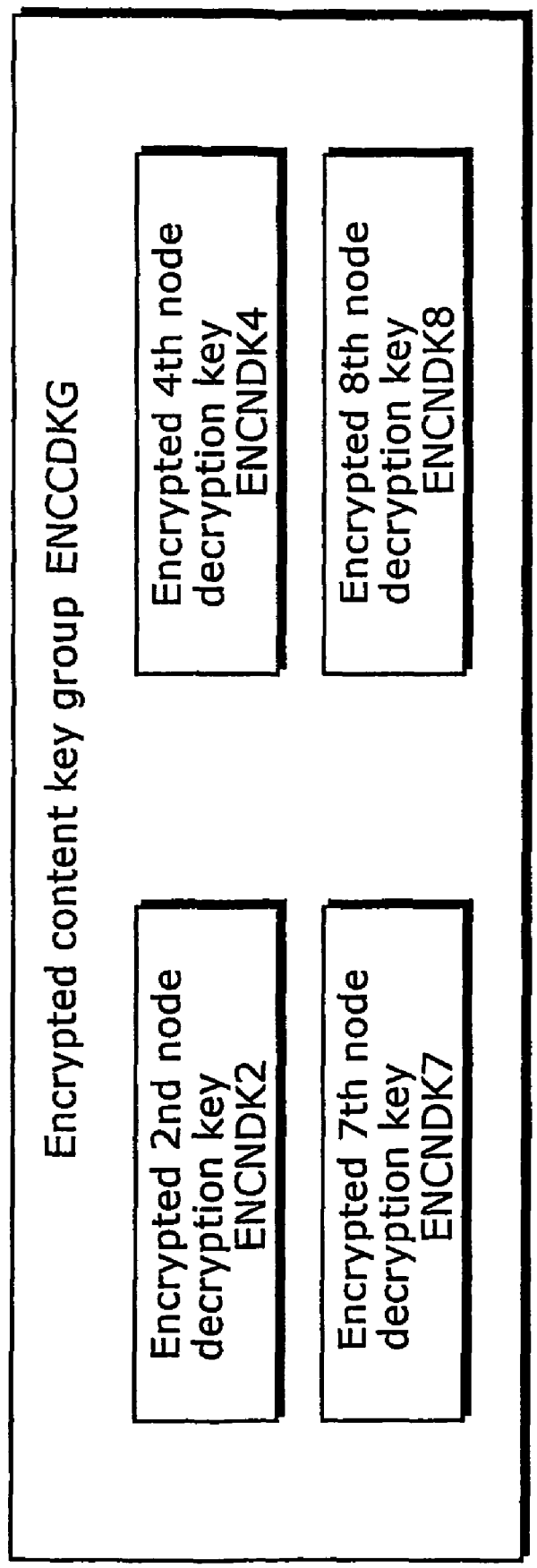
FIG. 14 is a diagram showing one example of an encrypted content key group ENCCDKG in the first embodiment of the present invention.

When receiving an encrypted content ENCCNT from the encryption unit 122, the content key selection unit 124 accesses the key information storage unit 123 so as to obtain a content decryption key CDK and a node encryption key group ALLNEK. Then, it selects a plurality of node encryption keys (NEK0 to NEK14) to be used for encrypting the content decryption key CDK from among the node encryption key group ALLNEK in the following manner. First, the content key selection unit 124 selects, on a random basis, one of the node encryption keys (NEK7 to NEK 14) associated with the terminal nodes one on one in a tree structure. It should be noted here that one of the terminal nodes (the $7^{th}$ node to the $14^{th}$ node) to be selected varies every time the content encryption key CEK and the content decryption key CDK are updated. It repeats selecting a node encryption key that corresponds to a node decryption key held by any of the output apparatuses $1$3a to 13h which has not yet been assigned the node decryption key that corresponds to the selected node encryption key. According to this method, the content key selection unit 124 selects, from among a node encryption key group, a plurality of node encryption keys to be used for encrypting a content decryption key CDK. Then, it encrypts the content decryption key CDK using each of the selected plurality of node encryption keys. For example, the output apparatuses 13a holds the $7^{th}$ node decryption key NDK7, the output apparatus 13b holds the $8^{th}$ node decryption key NDK8, the output apparatuses 13c to 13d hold the $4^{th}$ node decryption key NDK4, and the output apparatuses 13c to 13h hold the $2^{nd}$ node decryption key NDK2. Therefore, it is possible to select the encrypted $2^{nd}$ node decryption key ENCNDK2=Enc (NDK2, CDK), the encrypted $4^{th}$ node decryption key ENCNDK4=Enc (NDK4, CDK), the encrypted $7^{th}$ node decryption key ENCNDK7=Enc (NDK7, CDK) and the encrypted eighth node decryption key ENCNDK8=Enc (NDK8, CDK). The content key selection unit 124 generates an encrypted content key group ENC-CDKG that consists of a plurality of encrypted node decryption keys as shown in FIG. 14, and outputs the received encrypted content ENCCNT and the encrypted content key group ENCCDKG for that content to the transmission unit 125. For example, in the case where the content key selection unit 124 selects, as a plurality of node encryption keys, NEK2, NEK4, NEK7 and NEK8, the cipher text is ENCCDKG=Enc (NEK2, CDK)||Enc (NEK4, CDK)||Enc (NEK7, CDK)||Enc (NEK8, CDK).

(5) Transmission Unit 125

The transmission unit 125 distributes, in sequence, the encrypted content ENCCNT and the encrypted content key group ENCCDKG received from the content key selection unit 124, to the plurality of output apparatuses 13a to 13h via the communication path 10.

(6) Receiving Unit 126

The receiving unit 126, in the case of receiving a node encryption key group ALLNEK from the key issuing center 11, stores the received node encryption key group ALLNEK into the key information storage unit 123.

(7) Content Key Generation Unit 127

The content key updating conditions are previously given to the content key generation unit 127, and the content key generation unit 127 generates a pair of a content encryption key CEK and a corresponding content decryption key CDK on a random basis when the conditions are satisfied. For example, the content encryption key CEK and the content decryption key CDK are 128-bit AES keys. The content key generation unit 127 stores the content encryption key CEK and the content decryption key CDK into the key information storage unit 123. Note that the content key updating conditions are, for example, "every one minute" and the like. These conditions can be realized by incorporating a counter into the content key generation unit 127.

<Operations of Server 12>

Figure 15:
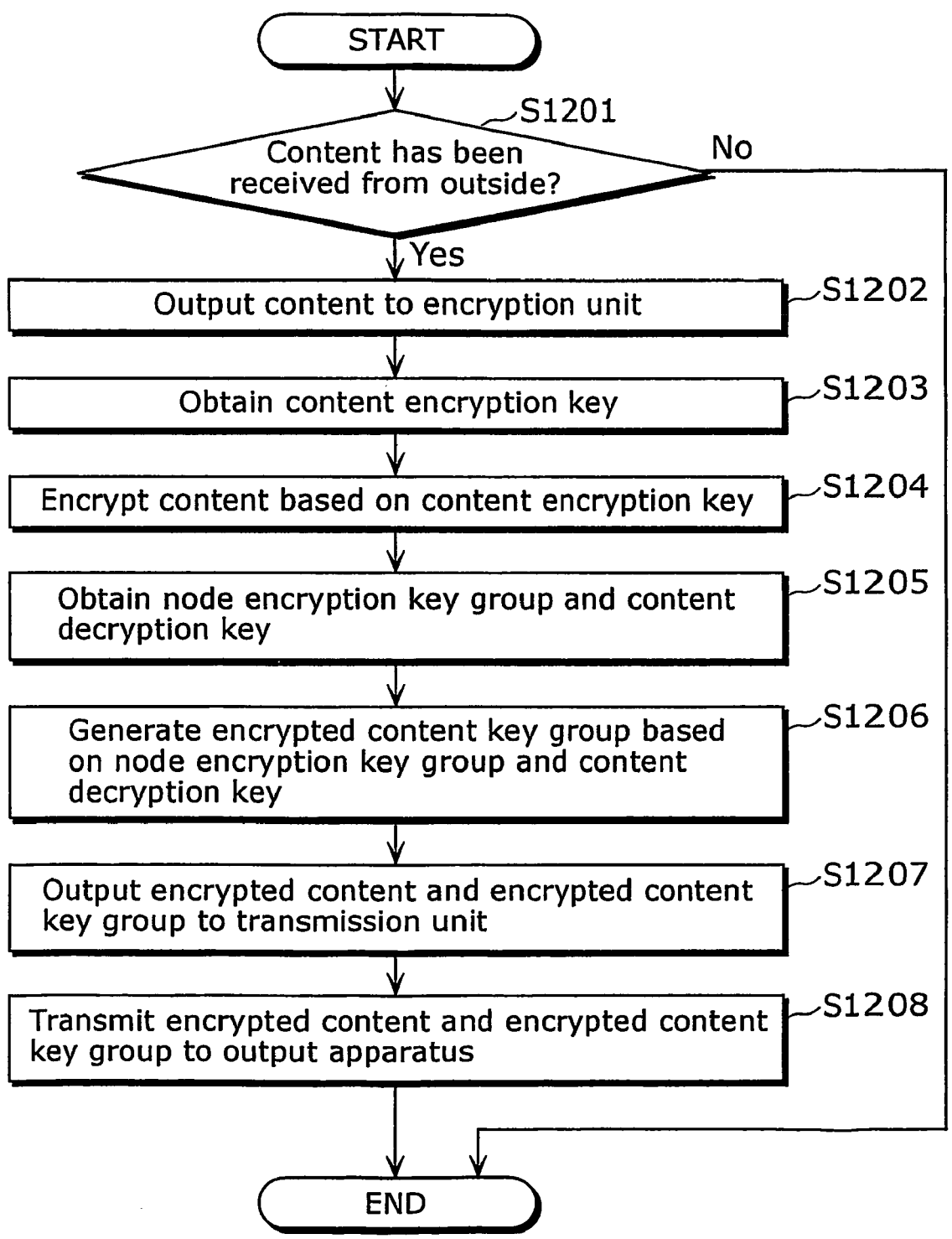
FIG. 15 is a flowchart of processes in which the server 12 distributes a content in the first embodiment of the present invention.
Figure 16:
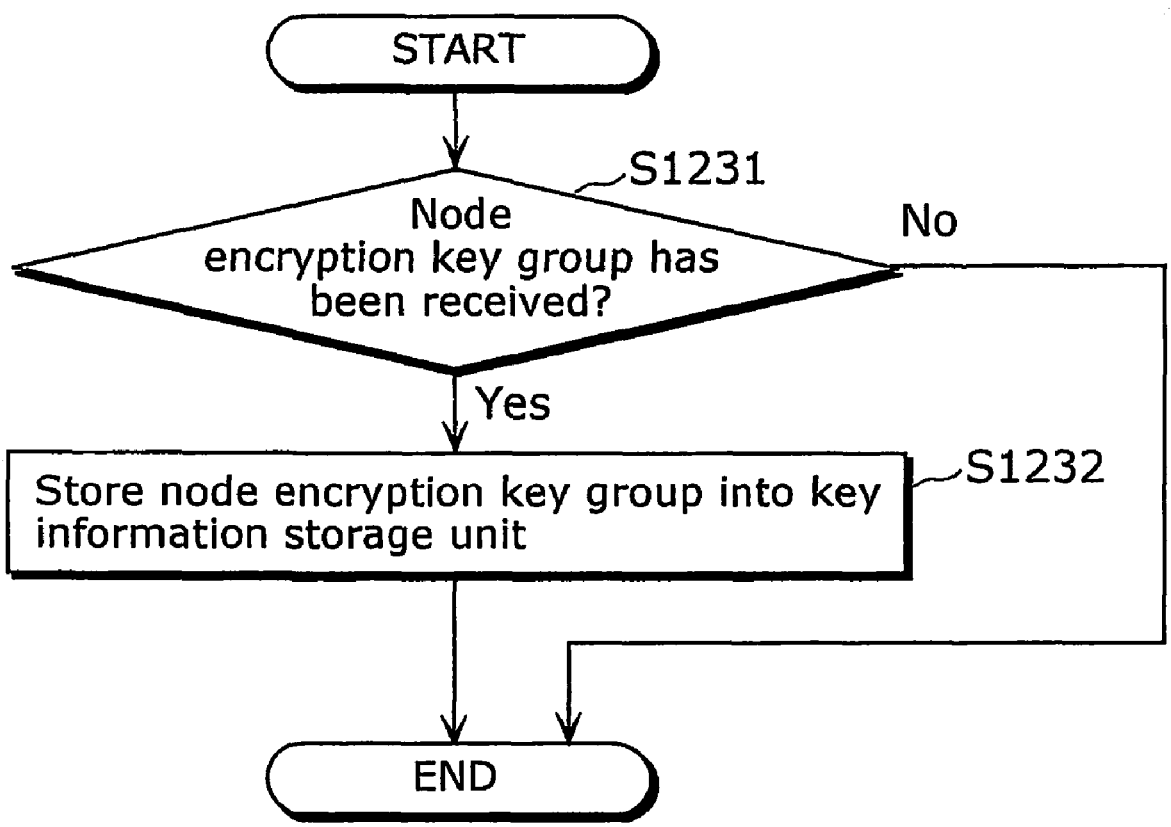
FIG. 16 is a flowchart of processes in which the server 12 receives a node encryption key group in the first embodiment of the present invention.
Figure 17:
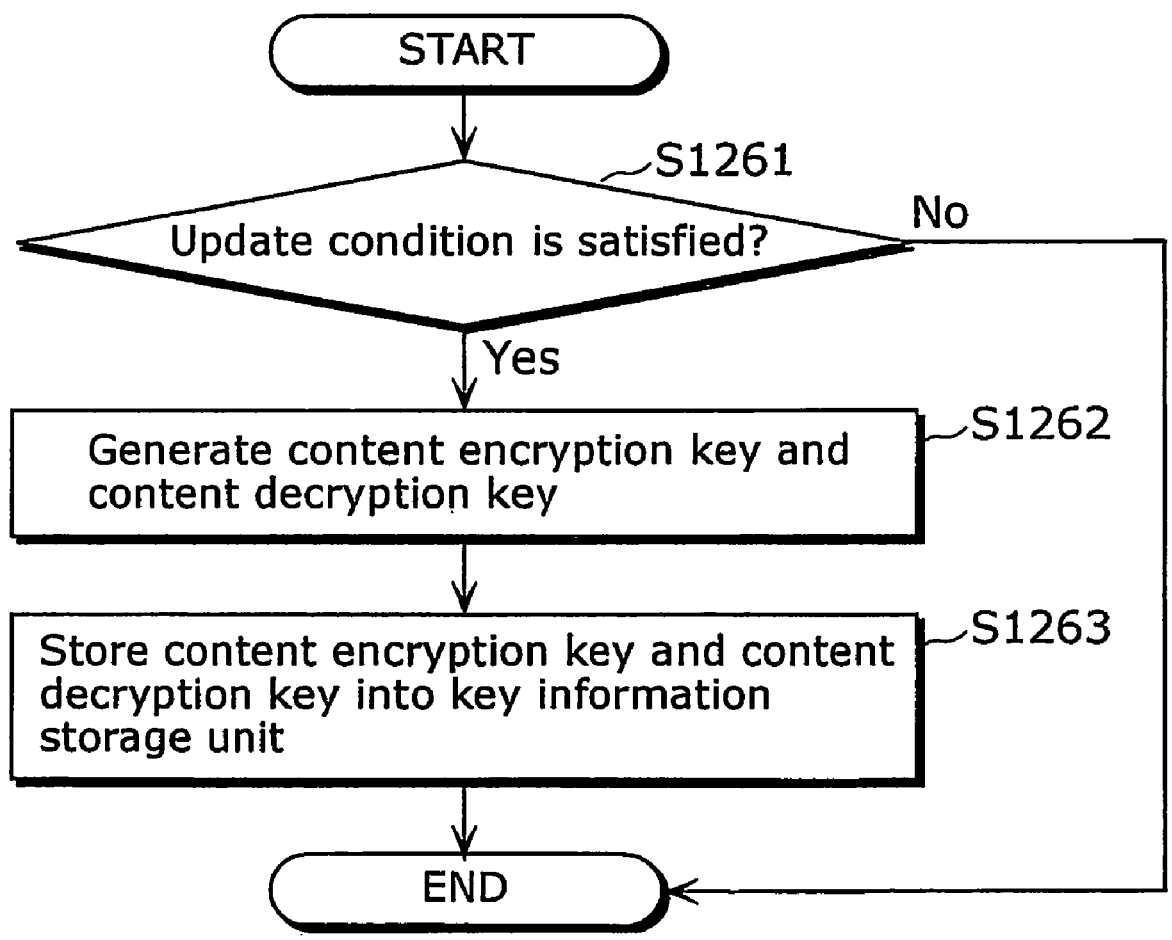
FIG. 17 is a flowchart of processes in which the server 12 updates a content key in the first embodiment of the present invention.

In the above, the structure of the server 12 is explained. Hereinafter, the operations of the server 12 are explained. First, the operation when the server 12 distributes a content is explained using a flowchart shown in FIG. 15. Then, the operation when the server 12 receives a node encryption key group ALLNEK using a flowchart shown in FIG. 16. Lastly, the operation when updating a content encryption key CEK and a content decryption key CDK is explained using a flowchart shown in FIG. 17.

<<Operation When Distributing Content >>

When the receiving unit 121 receives a content CNT from outside, the operation moves on to Step S1202. When it does not receive the content CNT, the operation is terminated (S1201).

The receiving unit 121 outputs the received content CNT to the content encryption unit 122 (S1202).

The first encryption unit 122 which received the content CNT accesses the key information storage unit 113 and obtains the content encryption key CEK (S1203).

The first encryption unit 122 encrypts the content CNT based on the content encryption key CEK and outputs the encrypted content ENCCNT to the content key selection unit 124 (S1204).

The content key selection unit 124 which received the encrypted content ENCCNT accesses the key information storage unit 123 and obtains the node encryption key group ALLNEK and the content decryption key CDK (S1205).

The content key selection unit 124 selects, on a random basis, one of the node encryption keys NEK7 to NEK14 associated with the terminal nodes of a tree structure, and repeats selecting a node encryption key corresponding to a node decryption key held by any of the output apparatuses 13a to 13h which has not been assigned the node decryption key corresponding to the selected node encryption key.

According to the above method, the content key selection unit 124 selects a plurality of node encryption keys to be used for encrypting the content decryption key CDK from among the node encryption key group, and encrypts the content decryption key CDK using each of the selected plurality of node encryption keys. Then, it generates an encrypted content key group ENCCDKG that is made up of a plurality of cipher texts (S1206).

The content key selection unit 124 transmits the encrypted content key group ENCCDKG and the encrypted content ENCCNT to the transmission unit 125 (S1207).

The transmission unit 125 which received the encrypted content ENCCNT and the encrypted content key group ENC-CDK distributes the encrypted content ENCCNT and the encrypted content key group ENCCDK to the output apparatuses 13a to 13h, and the operation is terminated (S1208).

<<Operation When Receiving Node Encryption Key Group ALLNEK >>

In the case where the receiving unit 126 receives the node encryption key group ALLNEK from the key issuing center 11, the operation moves on to Step S1232. When it does not receive the node encryption key group ALLNEK, the operation is terminated (S1231).

The receiving unit 126 stores the received node encryption key group ALLNEK into the key information storage unit 123, and the operation is terminated (S1232).

<<Operation When Updating Content Encryption Key and Content Decryption Key>>

In the case where the pre-given content key update conditions are satisfied, the content key generation unit 127 moves on to Step S1262. In the case where the conditions are not satisfied, the operation is terminated (S1261).

The content key generation unit 127 generates a pair of a content encryption key CEK and a corresponding content decryption key CDK on a random basis (S1262).

The content key generation unit 127 stores the content encryption key CEK and the content decryption key CDK into the key information storage unit 123, and the operation is terminated (S1263).

In the above, the structure and the operations of the server 12 that is one of the constituents of the content distribution system 1 are explained. Here is an explanation of the structures and the operations of the output apparatuses 13a to 13h. First, the structure and the operations of the output apparatus 13a is explained, and then the differences between the output apparatus 13a and other output apparatuses 13b to 13h are described.

<Structure of Output Apparatus 13a>

Figure 18:
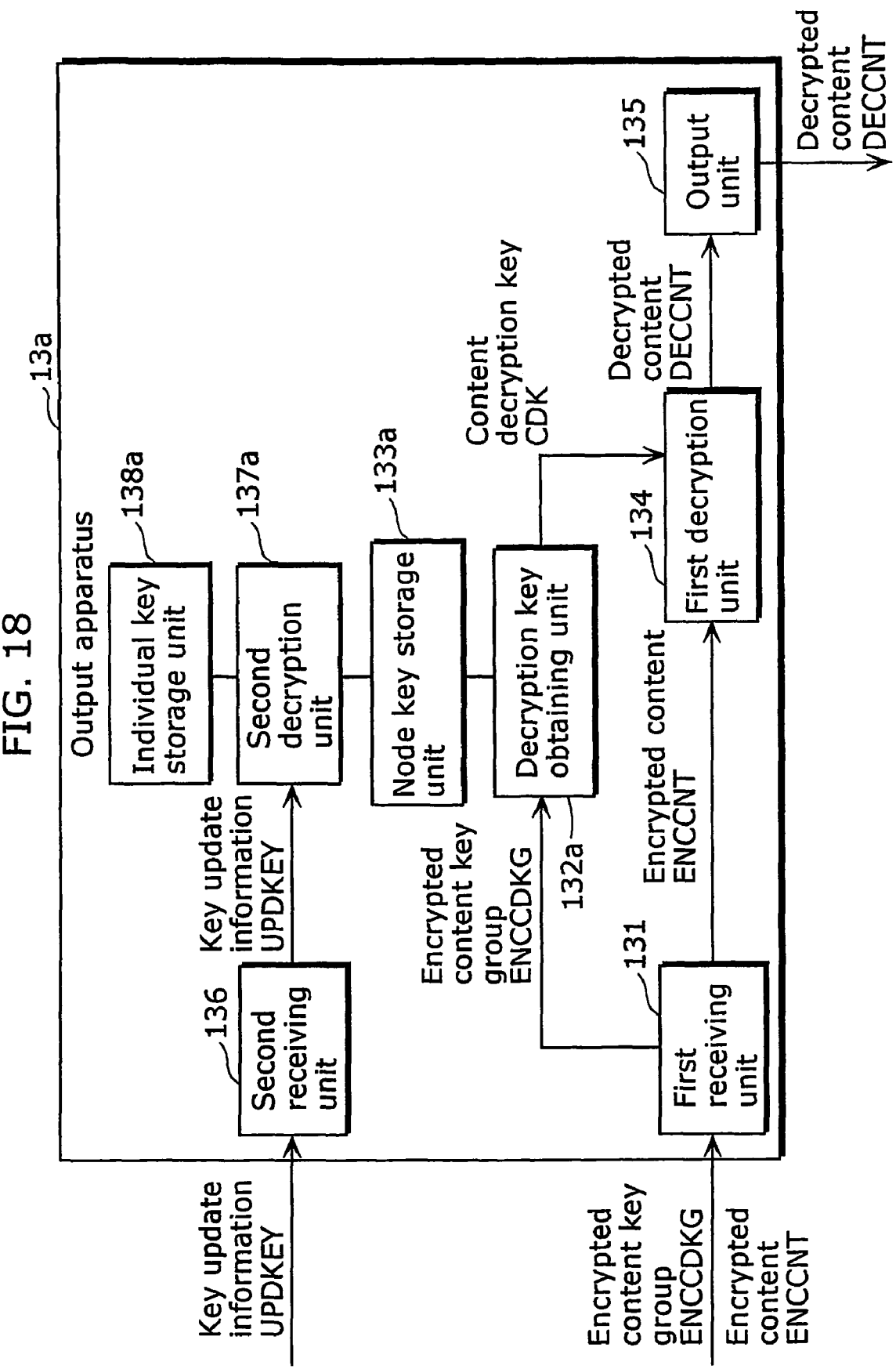
FIG. 18 is a block diagram showing a structure example of the output apparatus 13a in the first embodiment of the present invention.

As shown in FIG. 18, the output apparatus 13a is made up of a first receiving unit 131, a decryption key obtaining unit 132a, a node key storage unit 133a, a first decryption unit 134, an output unit 135, a second receiving unit 136, a second decryption unit 137a, and an individual key storage unit 138a. Here, the first receiving unit 131, the first decryption unit 134, the output unit 135, and the second receiving unit 136 are the constituents common to the output apparatuses 13a to 13h. On the other hand, the decryption key obtaining unit 132a, the node key storage unit 133a, the second decryption unit 137a and the individual key storage unit 138a are the constituents specific to the output apparatus 13a.

(1) First Receiving Unit 131

In the case where the first receiving unit 131 receives the encrypted content ENCCNT and the encrypted content key group ENCCDKG from the server 12, the first receiving unit 131 outputs the received encrypted content key group ENC- CDKG to the decryption key obtaining unit 132a and then outputs the encrypted content ENCCNT to the first decryption unit 134.

(2) Decryption Key Obtaining Unit 132a

Figure 19:
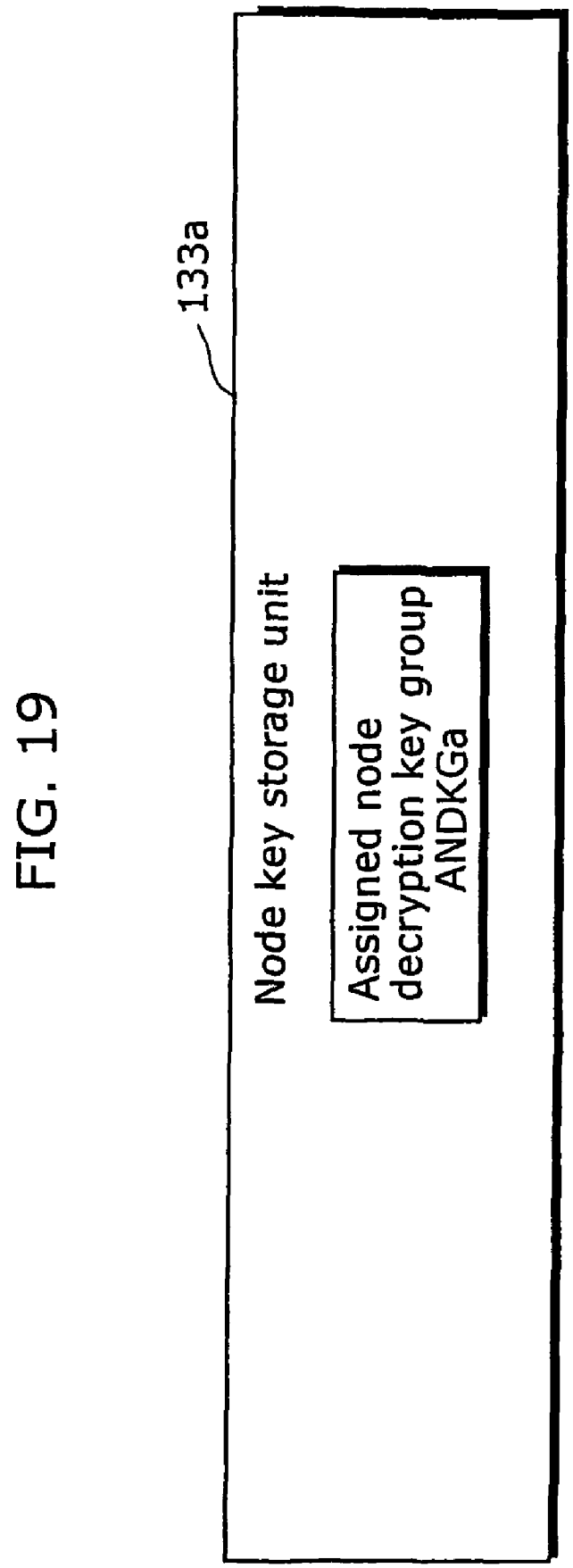
FIG. 19 is a diagram showing a structure example of a node key storage unit 133a in the first embodiment of the present invention.

In the case where the decryption key obtaining unit 132a receives the encrypted content key group ENCCDKG from the first receiving unit 131, it firstly accesses the node key storage unit 133a as shown in FIG. 19 and obtains assigned node decryption key group ANDKGa. Then, it obtains four node decryption keys that that make up the assigned node decryption key group ANDKGa. For example, in the case of the assigned node decryption key group ANDKGa as shown in FIG. 5, it obtains the $0^{th}$, $1^{st}$, $3^{rd}$ and $7^{th}$ node decryption keys NDK0, NDK1, NDK3 and NDK7. After that, the decryption key obtaining unit 132a searches for the cipher text corresponding to any of the four node decryption keys included in the assigned node decryption key group AND-KGa, from among the received encrypted content key group ENCCDKG. For example, in the case of the encrypted content key group ENCCDKG as shown in FIG. 14, it searches for the encrypted $7^{th}$ node decryption key ENCNDK7=Enc (NDK7, CDK). Then, it decrypts the corresponding encrypted node decryption key using any of the four node decryption keys included in the assigned node decryption key group ANDKGa, and obtains the content decryption key CDK. After that, it outputs the content decryption key CDK to the first decryption unit 134.

(3) Node Key Storage Unit 133a

The node key storage unit 133a holds an assigned node decryption key group ANDKGa, as shown in FIG. 19. The decryption key obtaining unit 132a and the second decryption unit 137a can access the node key storage unit 133a.

(4) First Decryption Unit 134

In the case of receiving the encrypted content ENCCNT from the first receiving unit 131 and the content decryption key CDK from the decryption key obtaining unit 132a, the first decryption unit 134 decrypts the encrypted content ENCCNT based on the content decryption key CDK. An algorithm to be used for the decryption is, for example, an AES or DES block cipher algorithm and the like, and the first decryption unit 134 uses the same method as the algorithm used by the encryption unit 122 of the server 12. The first decryption unit 134 outputs the decrypted content DECCNT=Dec (CDK, ENCCNT) to the output unit 135. Here, Dec (K, C) is a decryption text used when a cipher text C is decrypted based on a decryption key K.

(5) Output Unit 135

The output unit 135 outputs the received decrypted content DECCNT to the outside in the case of receiving the decrypted content DECCNT from the first decryption unit 134.

(6) Second Receiving Unit 136

The second receiving unit 136, in the case of receiving key update information UPDKEY from the server 12, outputs the received key update information UPDKEY to the second decryption unit 137a.

(7) Second Decryption Unit 137a

Figure 20:
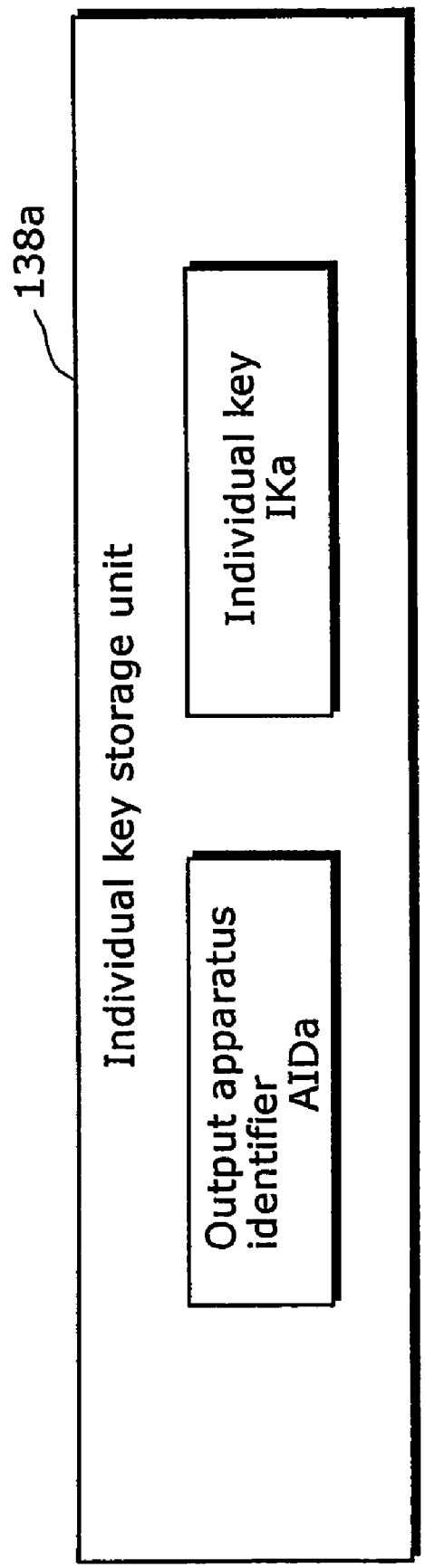
FIG. 20 is a diagram showing a structure example of an individual key storage unit 138a in the first embodiment of the present invention.

The second decryption unit 137a, in the case of receiving key update information UPDKEY from the second receiving unit 136, first obtains the output apparatus identifier AIDa and the individual key IKa from the individual key storage unit 138a as shown in FIG. 20, and searches, within the received key update information UPDKEY, for the encrypted assigned node decryption key group ENCANDKGa corresponding to the output apparatus identifier AIDa stored in the individual key storage unit 138a. Then, it decrypts the encrypted assigned node decryption key group ENCANDKGa based on the individual key IKa stored in the individual key storage unit 138a, and stores the decrypted assigned node decryption key group ANDKGa into the node key storage unit 133a.

(8) Individual Key Storage Unit 138a

The individual key storage unit 138a holds the output apparatus identifier AIDa and the individual key IKa as shown in FIG. 20. The second decryption unit 137a can access the individual key storage unit 138a.

<Operations of Output Apparatus 13a>

Figure 21:
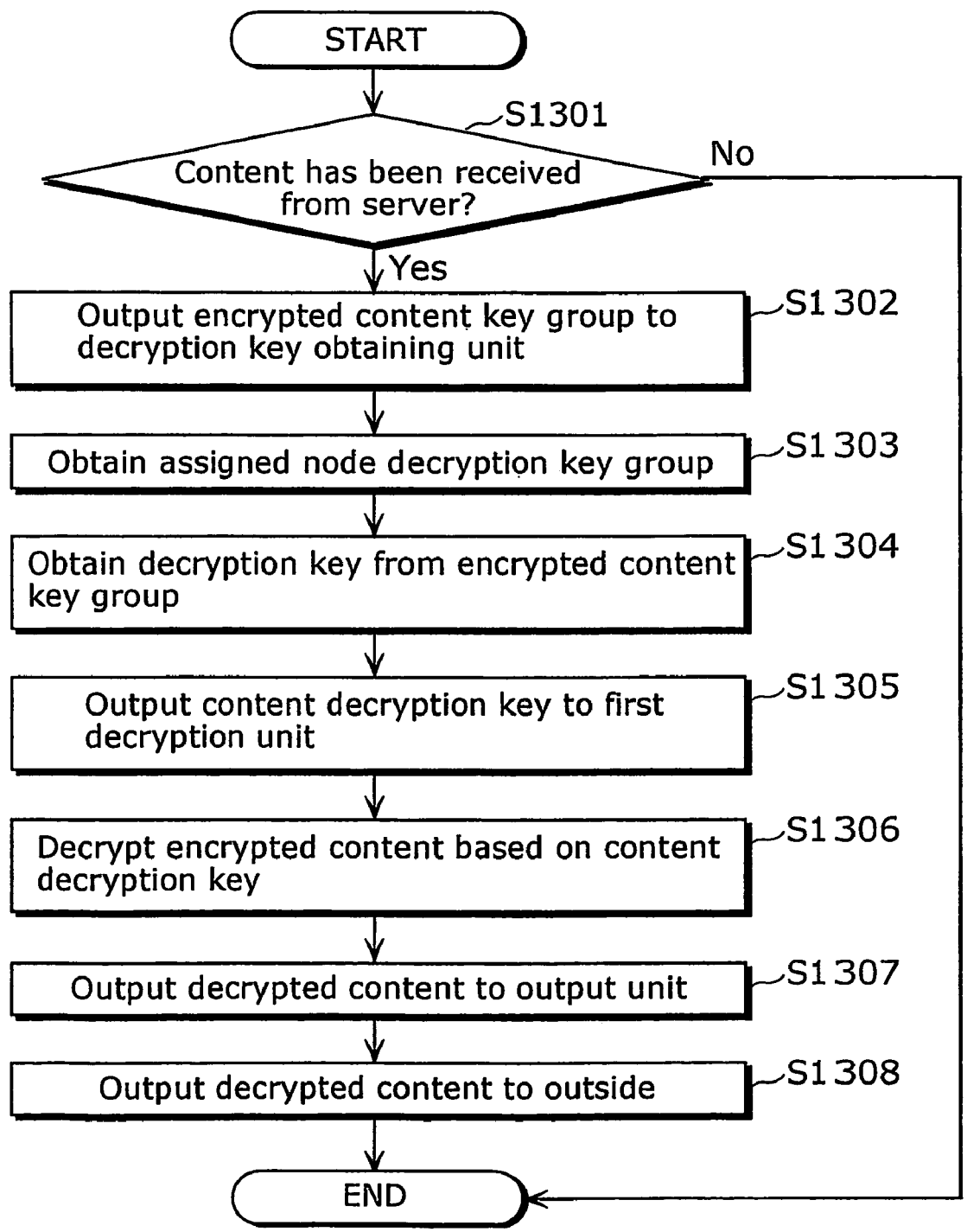
FIG. 21 is a flowchart of processes in which the server 12 receives an encrypted content.
Figure 22:
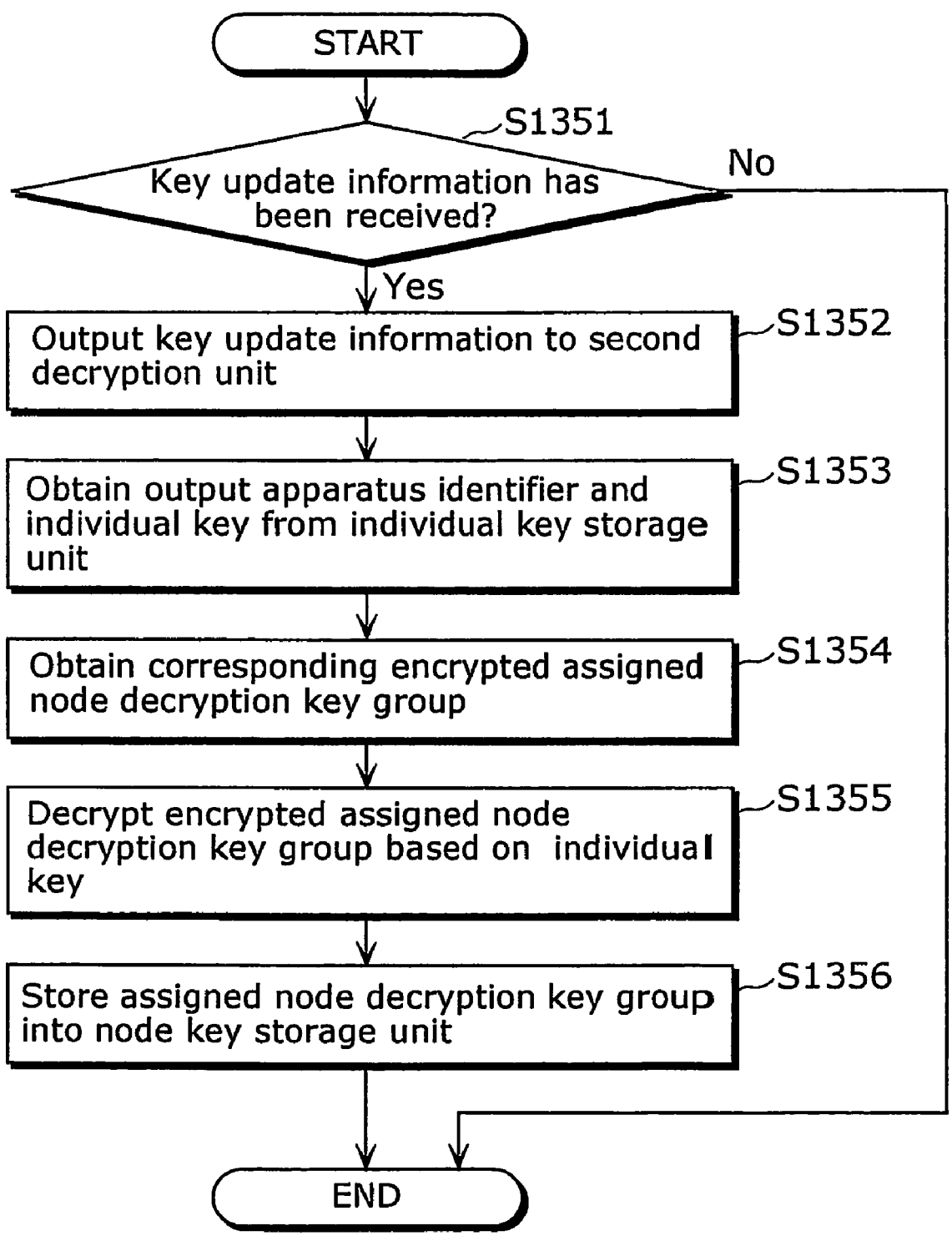
FIG. 22 is a flowchart of processes in which the server 12 receives key update information.

In the above, the structure of the output apparatus 13a is explained. Here, the operations of the output apparatus 13a are explained. First, the operation in the case where the output apparatus 13a receives an encrypted content ENCCNT is explained using a flowchart shown in FIG. 21. Next, the operation in the case where the output apparatus 13a receives key update information UPDKEY is explained using a flowchart shown in FIG. 22.

<<Operation When Receiving Encrypted Content >>

In the case where the first receiving unit 131 receives an encrypted content ENCCNT and an encrypted content key group ENCCDKG, the operation moves on to Step S1302. When it does not receive them, the operation is terminated (S1301).

The first receiving unit 131 outputs the received encrypted content key group ENCCDKG to the decryption key obtaining unit 132a (S1302).

The decryption key obtaining unit 132a which received the encrypted content key group ENCCDKG accesses the node key storage unit 133a and obtains the assigned node decryption key group ANDKGa (S1303).

The decryption key obtaining unit 132a obtains four node decryption keys from among the assigned node decryption key group ANDKGa. Then, it searches, within the encrypted content key group ENCCDKG, for the encrypted node decryption key associated with any of the four node decryption keys, decrypts the encrypted node decryption key using the corresponding node decryption key among the four node decryption keys, and obtains the content decryption key CDK (S1304).

The decryption key obtaining unit 132a outputs the content decryption key CDK to the first decryption unit 134 (S1305).

The first decryption unit 134 decrypts the encrypted content ENCCNT based on the received content decryption key CDK and obtains the decrypted content DECCNT (S1306).

The first decryption unit 134 outputs the decrypted content DECCNT to the output unit 135 (S1307).

The output unit 135 receives the decrypted content DECCNT from the first decryption unit 134, outputs the received decrypted content DECCNT to the outside, and terminates the operation (S1308).

<<Operation When Receiving Key Update Information UPDKEY>>

In the case where the second receiving unit 1.36 receives the key update information UPDKEY, the operation moves on to Step S1352. When it does not receive the key update information UPDKEY, the operation is terminated (S1351).

The second receiving unit 136 outputs the received key update information UPDKEY to the second decryption unit 137a (S1352).

The second decryption unit 137a obtains the output apparatus identifier AIDa and the individual key IKa from the individual key storage unit 138a (S1353).

The second decryption unit 137a obtains the encrypted assigned node decryption key group ENCANDKGa corresponding to the output apparatus identifier AIDa from the received key update information UPDKEY (S1354).

The second decryption unit 137a decrypts the encrypted assigned node decryption key group ENCANDKGa based on the individual key IKa and obtains the assigned node decryption key group ANDKGa (S1355).

The second decryption unit 137a stores the assigned node decryption key group ANDKGa into the node key group storage unit 133a, and terminates the operation (S1356).

These are the structure and operations of the output apparatus 13a which is one of the constituents of the content distribution system 1. Here, the differences between the output apparatus 13a and other output apparatuses 13b to 13h are i) that assigned node decryption key groups ANKa to ANKh which are different from each other are stored in the node key storage unit 133a respectively for the output apparatuses 13a to 13h, ii) that output apparatus identifiers AIDa to AIDh and individual keys IKa to IKh which are different from each other are stored in the individual key storage unit i38a respectively for the output apparatuses 13a to 13h, iii) that the decryption key obtaining unit 132a uses assigned node decryption key groups ANKa to AnKh which are different from each other respectively for the output apparatus 13a to 13h, and iv) that the second decryption unit 137a uses individual keys IKa to IKh which are different from each other respectively for the output apparatuses 13a to 13h.

<Operation Verification in First Embodiment>

Here is a description of a reason why the same content decryption key CDK can be derived in all of the output apparatuses 13a to 13h in spite of the fact that different assigned node decryption key groups ANDKGa to ANDKGh are respectively assigned to the output apparatuses 13a to 13h in the first embodiment. The server 12 selects, from among the node encryption key group, node encryption keys corresponding to a plurality of node decryption keys which are held by respective output apparatus 13a to 13h without exception, and encrypts a content decryption key CDK based on the selected plurality of node encryption keys. Therefore, the output apparatuses 13a to 13h can derive the same content decryption key CDK.

In the actual operation, for example, a plurality of node encryption keys to be used for encrypting a content decryption key as shown in FIG. 28 to FIG. 33 are changed at regular intervals. By doing so, it becomes possible to disallow an output apparatus to obtain a content decryption key for a certain period of time in every cycle without using the node decryption key of the terminal (Level 3). In addition, even if unauthorized output apparatuses in which the terminal node decryption keys are embedded become available on the market, it is possible to specify the output apparatus which is the origin of leakage of the individual key.

<Effect of First Embodiment>

According to the first embodiment of the present invention, it becomes possible to reduce the size of data to be distributed to output apparatuses when the key issuing center updates a content encryption key and a corresponding content decryption key in order to revoke an unauthorized output apparatus in which the content decryption key is embedded. To be more specific, assuming that there are eight output apparatuses, for example, in order to update a pair of a content encryption key CEK and a corresponding content decryption key CDK in the conventional art, eight cipher texts are required when encrypting the content decryption key using respective individual keys. On the other hand, assuming in the present embodiment that a plurality of node encryption keys are assigned as shown in FIG. 28 to FIG. 33, in order to update a pair of a content encryption key CEK and a corresponding content decryption key CDK, four cipher texts are required when encrypting the content decryption key using four node encryption keys, and thus reduction in data size can be achieved. In consequence, it becomes possible in the present embodiment to update a pair of a content encryption key and a corresponding content decryption key more frequently, and thus to improve resistance against attack of creating an unauthorized output apparatus embedded with a content decryption key whose leakage cannot be traced.

<Modification of First Embodiment>

Although only an exemplary embodiment of the present invention has been described in detail above, the present invention is not limited to the above embodiment and many modifications including those as described below are possible in the exemplary embodiment without departing from the scope of this invention.

(1) The communication path 10 may be a terrestrial or satellite broadcasting network.

(2) The number of output apparatuses 13a to 13h may be another number than eight. This can be easily realized by changing the depth of a tree structure that determines assignment of keys, or the like.

(3) Although one output apparatus is set for each terminal node in the present embodiment, a plurality of output apparatuses may be set for one terminal node.

(4) A node encryption key and a corresponding node decryption key may have the same value. If they have the same value, all that the key information storage unit 123 has to do is store either one of a node encryption key group and a node decryption key group. This can be realized if the content key selection unit 124 and the decryption key obtaining unit 132a use common key encryption or the like.

(5) A content encryption key CEK and a corresponding content decryption key may have the same value. If they have the same value, all that the key information storage unit 123 has to do is store either one of a content encryption key and a content decryption key. This can be realized if the encryption unit 122 and the decryption unit 134 use common key encryption or the like.

Figure 23:
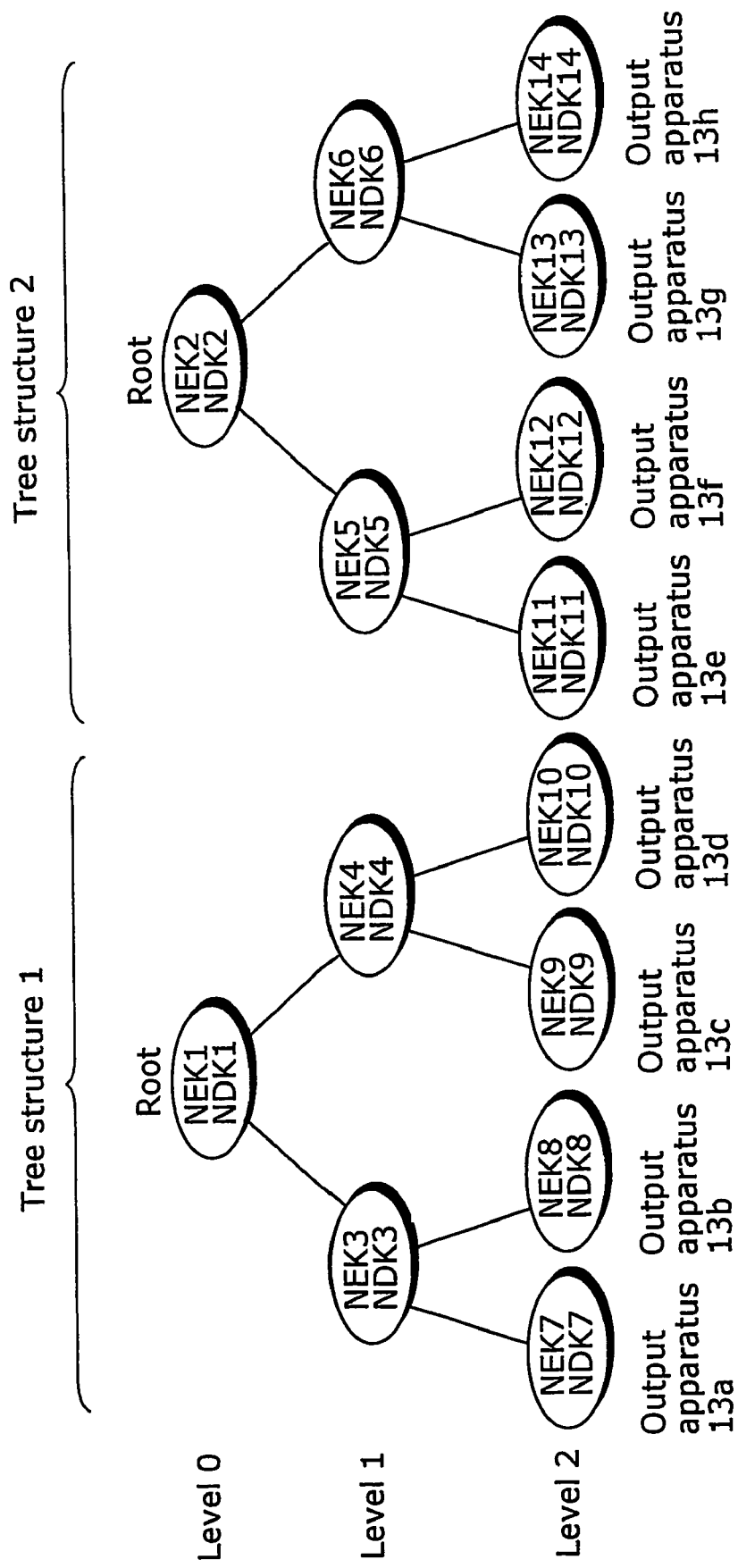
FIG. 23 is a diagram showing one example of assignment of node encryption keys and node decryption keys to the output apparatuses 13a to 13h.
Figure 24:
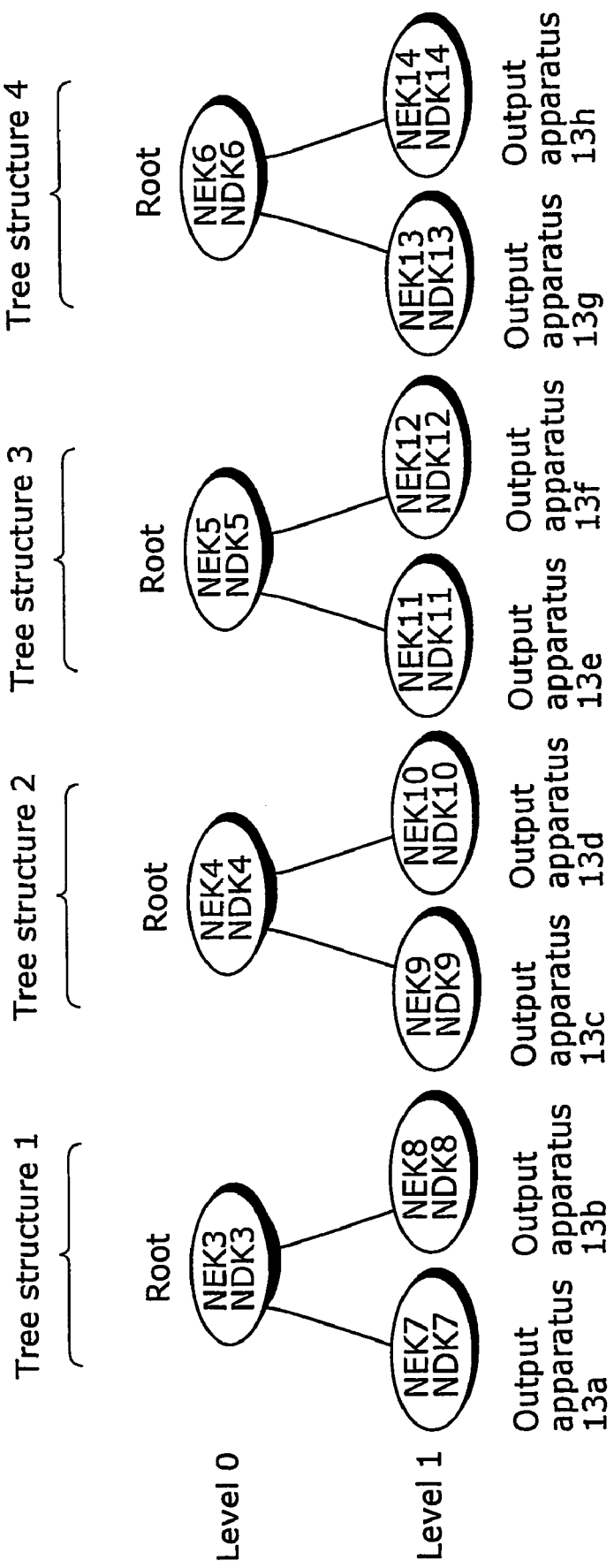
FIG. 24 is a diagram showing another example of assignment of node encryption keys and node decryption keys to the output apparatuses 13a to 13h.
Figure 25:
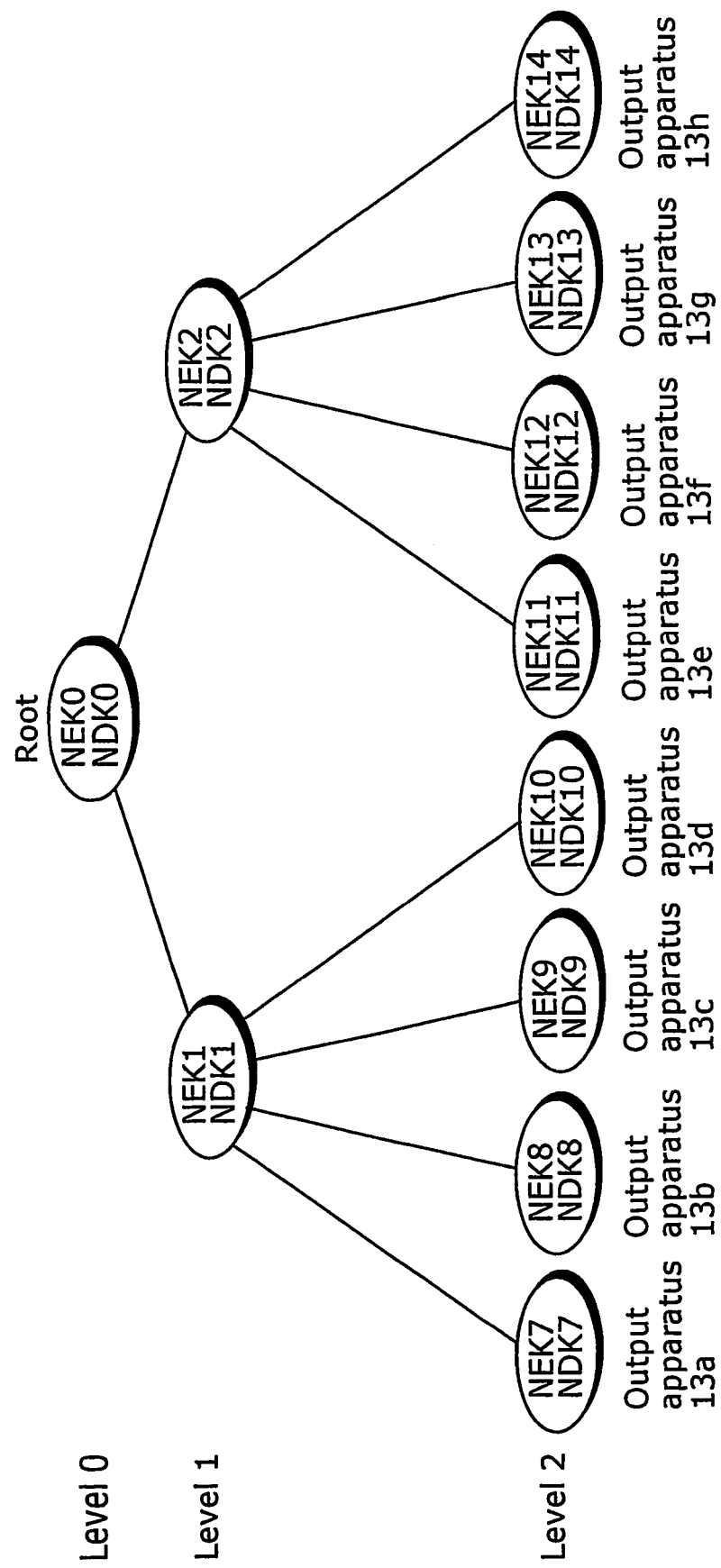
FIG. 25 is a diagram showing still another example of assignment of node encryption keys and node decryption keys to the output apparatuses 13a to 13h.
Figure 26:
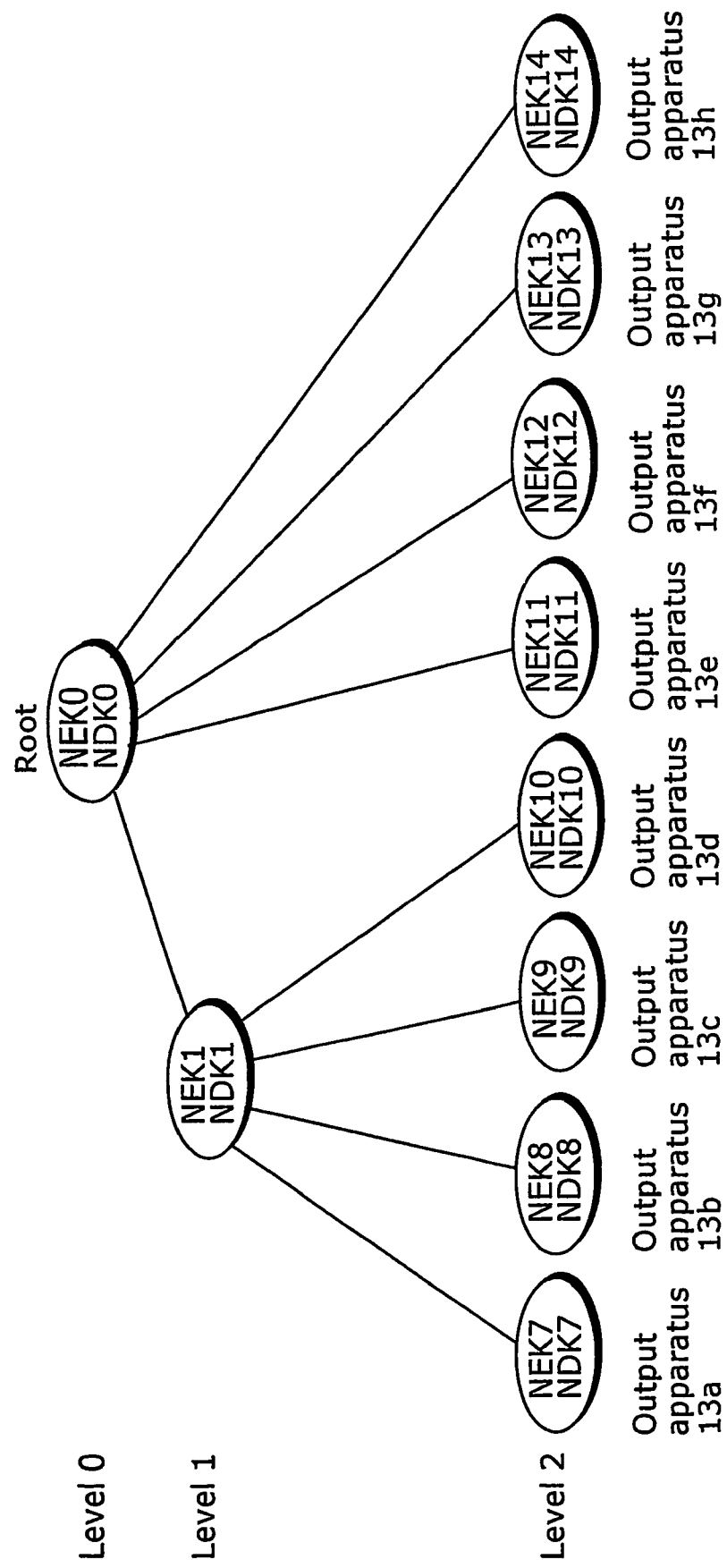
FIG. 26 is a diagram showing still another example of assignment of node encryption keys and node decryption keys to the output apparatuses 13a to 13h.

(6) A tree structure that determines assignment of keys is not limited to that as shown in FIG. 2. For example, two tree structures as shown in FIG. 23 may be used, four tree structures as shown in FIG. 24 may be used, or more than four tree structures may be used. Furthermore, a tree structure as shown in FIG. 25, without all the nodes at Level 2 of the tree structure in FIG. 2, may be used, or a tree structure as shown in FIG. 26, without one of the nodes at Level 1 and all the nodes at Level 2 of the tree structure in FIG. 2, may be used.

Figure 27:
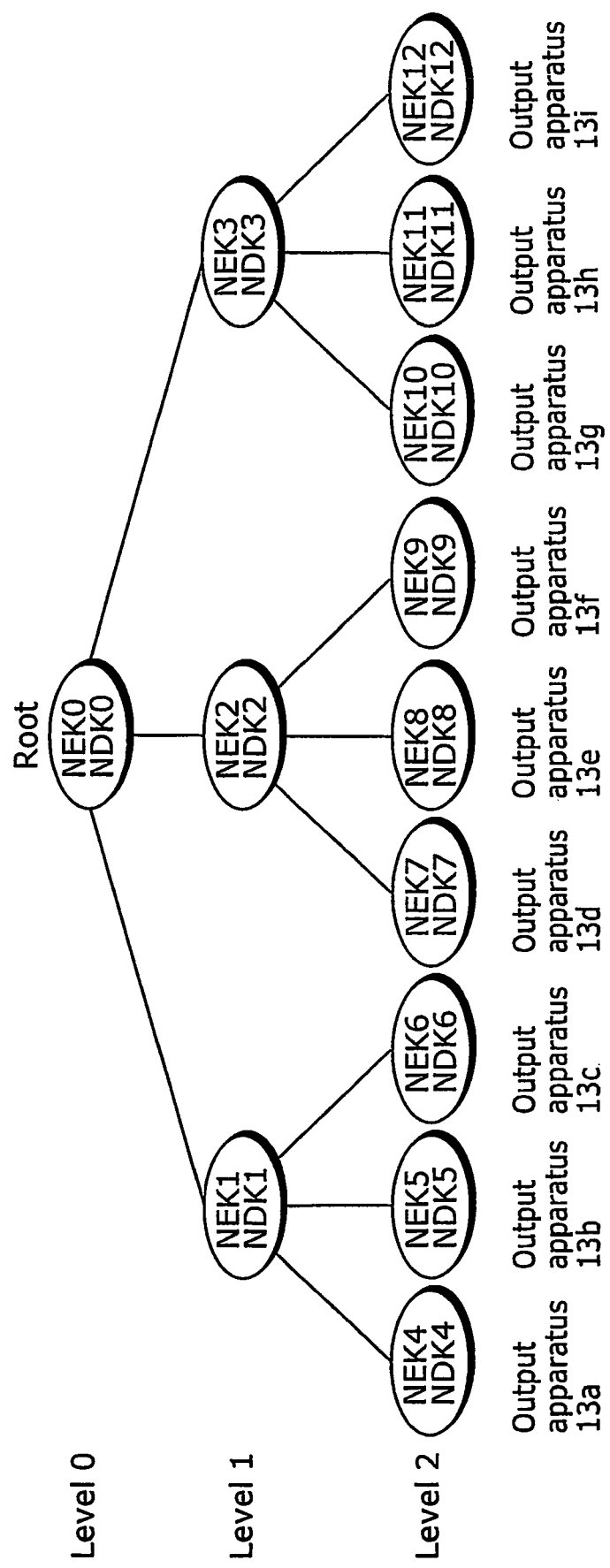
FIG. 27 is a diagram showing still another example of assignment of node encryption keys and node decryption keys to the output apparatuses 13a to 13i.

(7) With respect to a tree structure that determines assignment of keys, although it is a binary tree structure with two child nodes for each node in FIG. 2, it may be a tree structure with M children (M is 3 or a larger natural number). For example, it may be a ternary tree with three child nodes for each node as shown in FIG. 27. Furthermore, the number of child nodes for each node may vary by level.

(8) The server 12, not the key issuing center 11, may have a function of revoking an output apparatus. In other words, the server 12 may receive any of the output apparatus identifiers AIDa to AIDh and distribute key update information UPDKEY to a plurality of output apparatuses 13a to 13h based on the received output apparatus identifier AIDa to AIDh.

(9) The node key generation unit 111 of the key issuing center 11 may receive the node key generation request REQ1 from outside and generate a plurality of pairs of node encryption keys and corresponding node decryption keys based on the received node key generation request REQ1.

(10) The content key generation unit 127 of the server 12 may receive the content key generation request REQ3 from outside and generate a pair of a content encryption key CEK and a corresponding content decryption key CDK based on the received content key generation request REQ3.

(11) The transmission unit 125 of the server 12, in the case where there is no change from the encrypted content key group ENCCDKG which has been transmitted before, may transmit only the encrypted content ENCCNT to the output apparatuses 13*a* to 13*h* so that the output apparatuses 13*a* to 13*h* which received only the encrypted content ENCCNT decrypt the encrypted content ENCCNT based on only the content decryption key CDK which has been generated before.

(12) With respect to a method for selecting a plurality of node encryption keys to be used for encrypting a content decryption key, it is not necessary to select a node encryption key corresponding to one node decryption key which is owned by each of the output apparatuses 13*a* to 13*h*. For example, node encryption keys corresponding to two or more node decryption keys which are owned by some of the output apparatuses may be selected, or a node encryption key corresponding to a node decryption key which is not owned by some of the output apparatuses may be selected.

Figure 28:
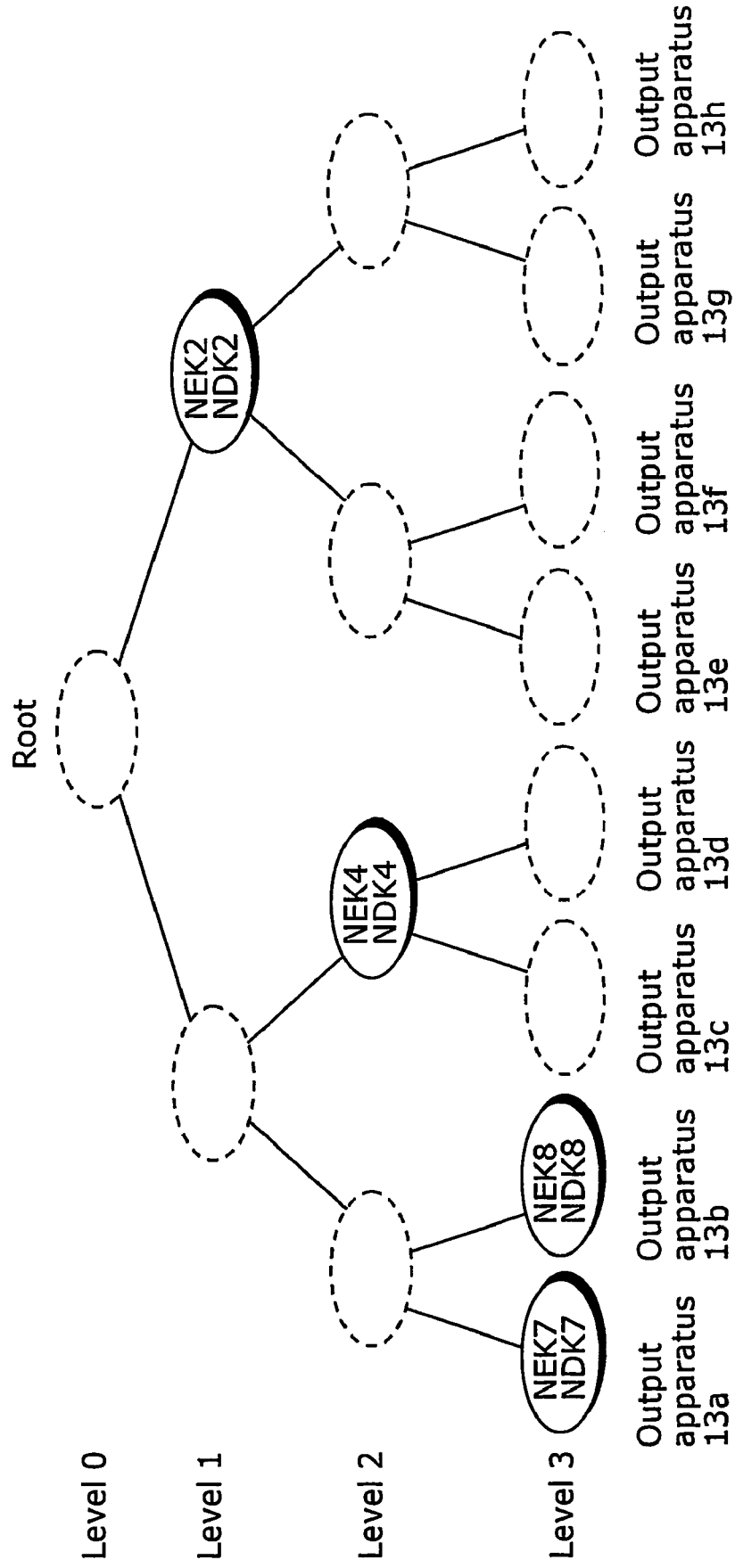
FIG. 28 is a diagram showing one example of selection of a plurality of node encryption keys to be used for encrypting a content decryption key.
Figure 29:
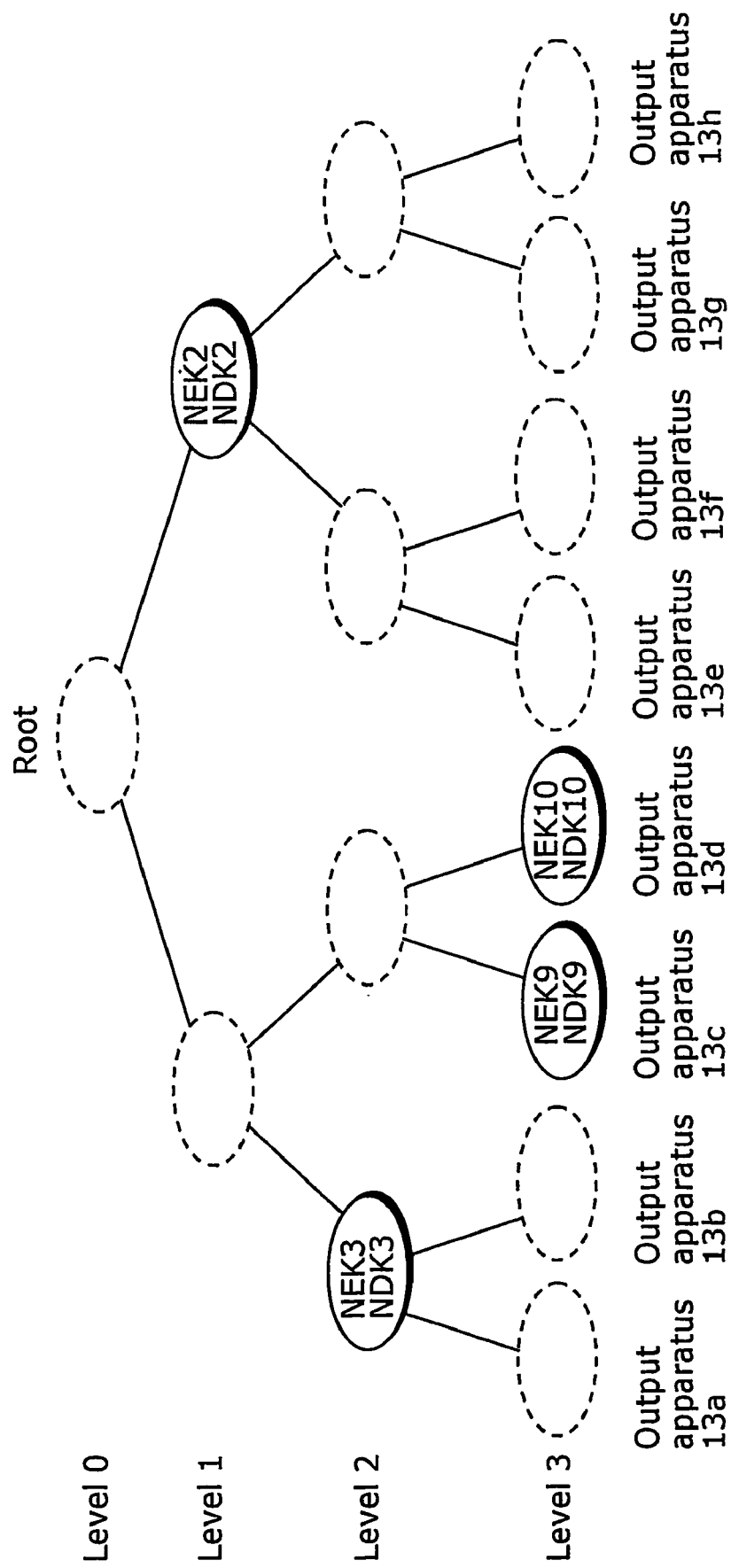
FIG. 29 is a diagram showing another example of selection of a plurality of node encryption keys to be used for encrypting a content decryption key.
Figure 30:
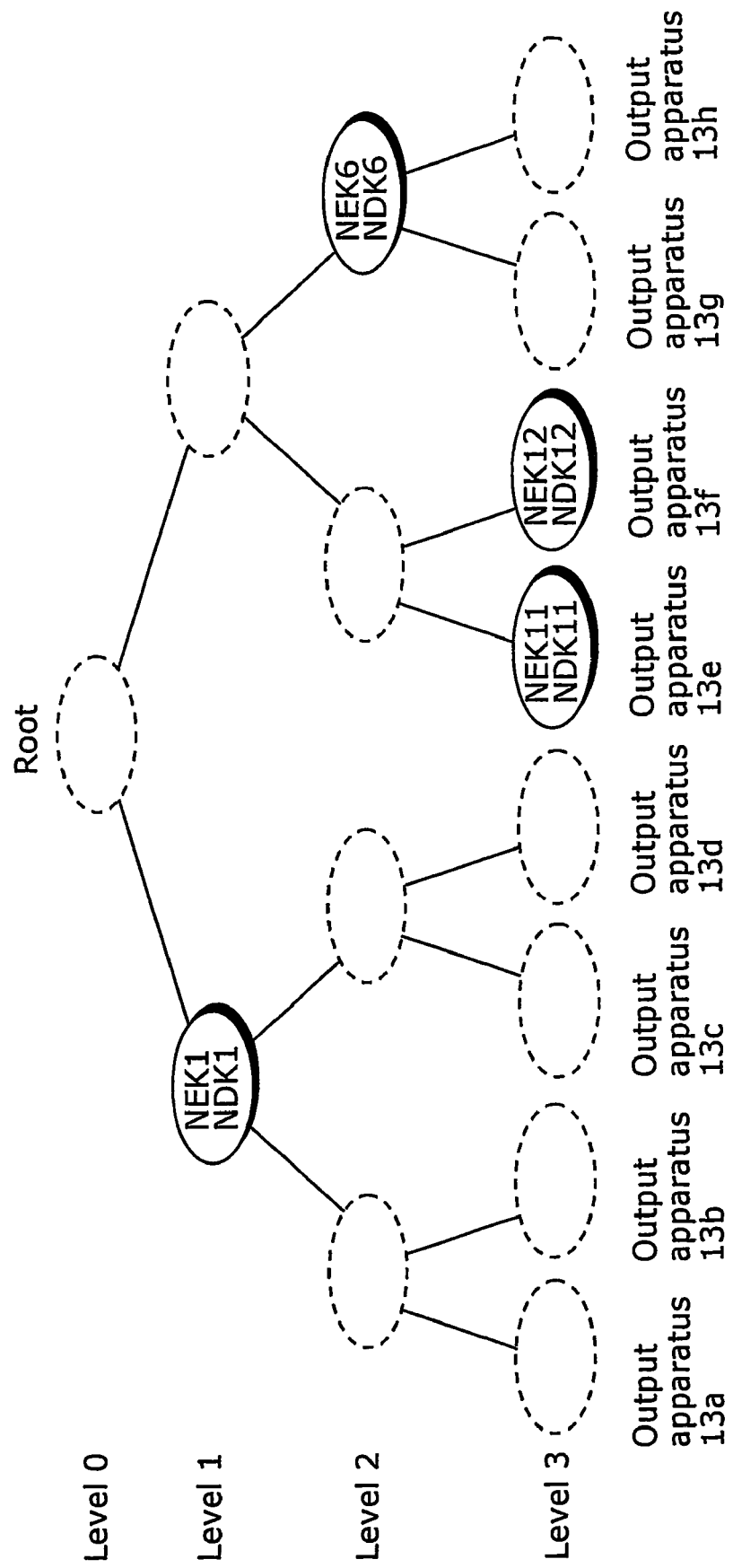
FIG. 30 is a diagram showing still another example of selection of a plurality of node encryption keys to be used for encrypting a content decryption key.
Figure 31:
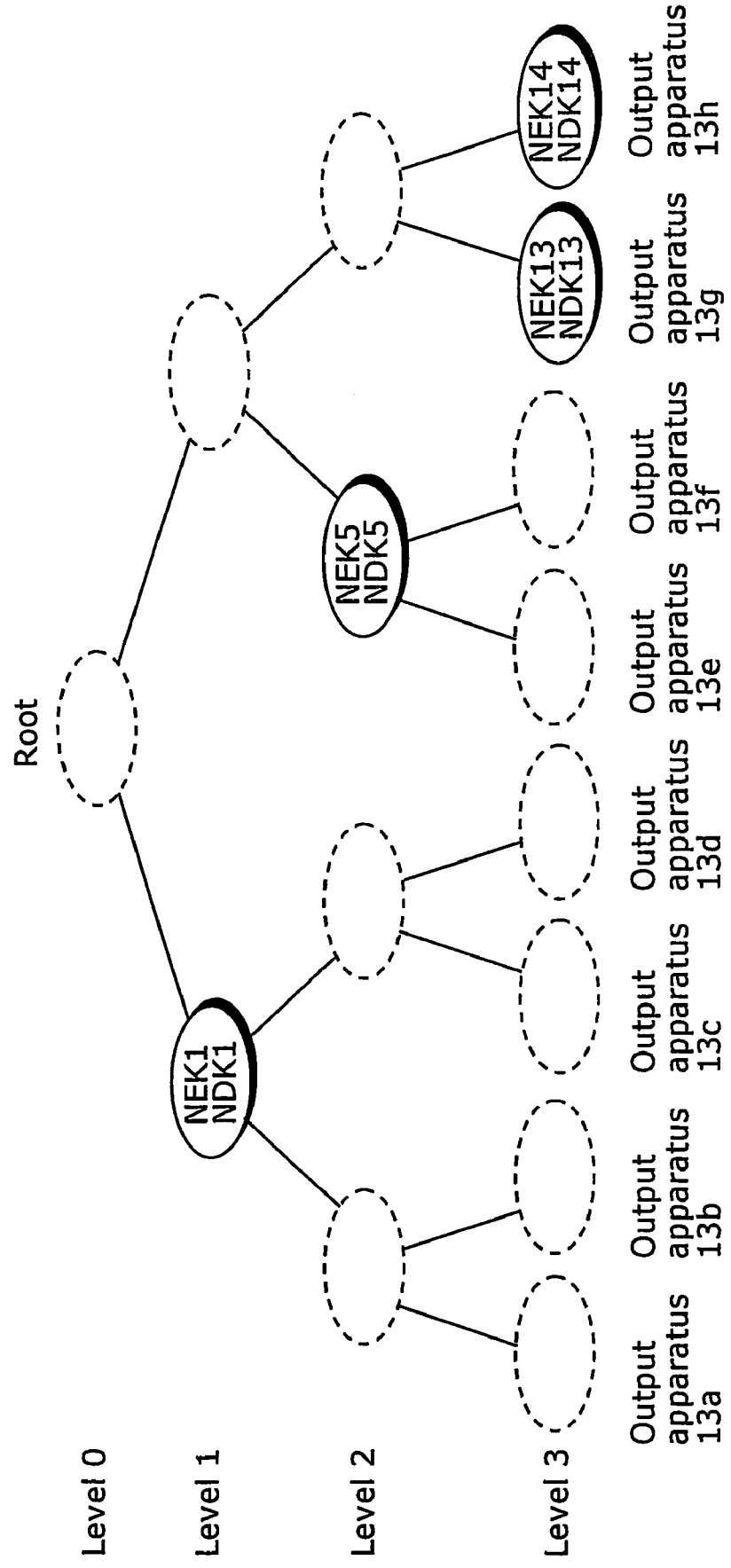
FIG. 31 is a diagram showing still another example of selection of a plurality of node encryption keys to be used for encrypting a content decryption key.
Figure 32:
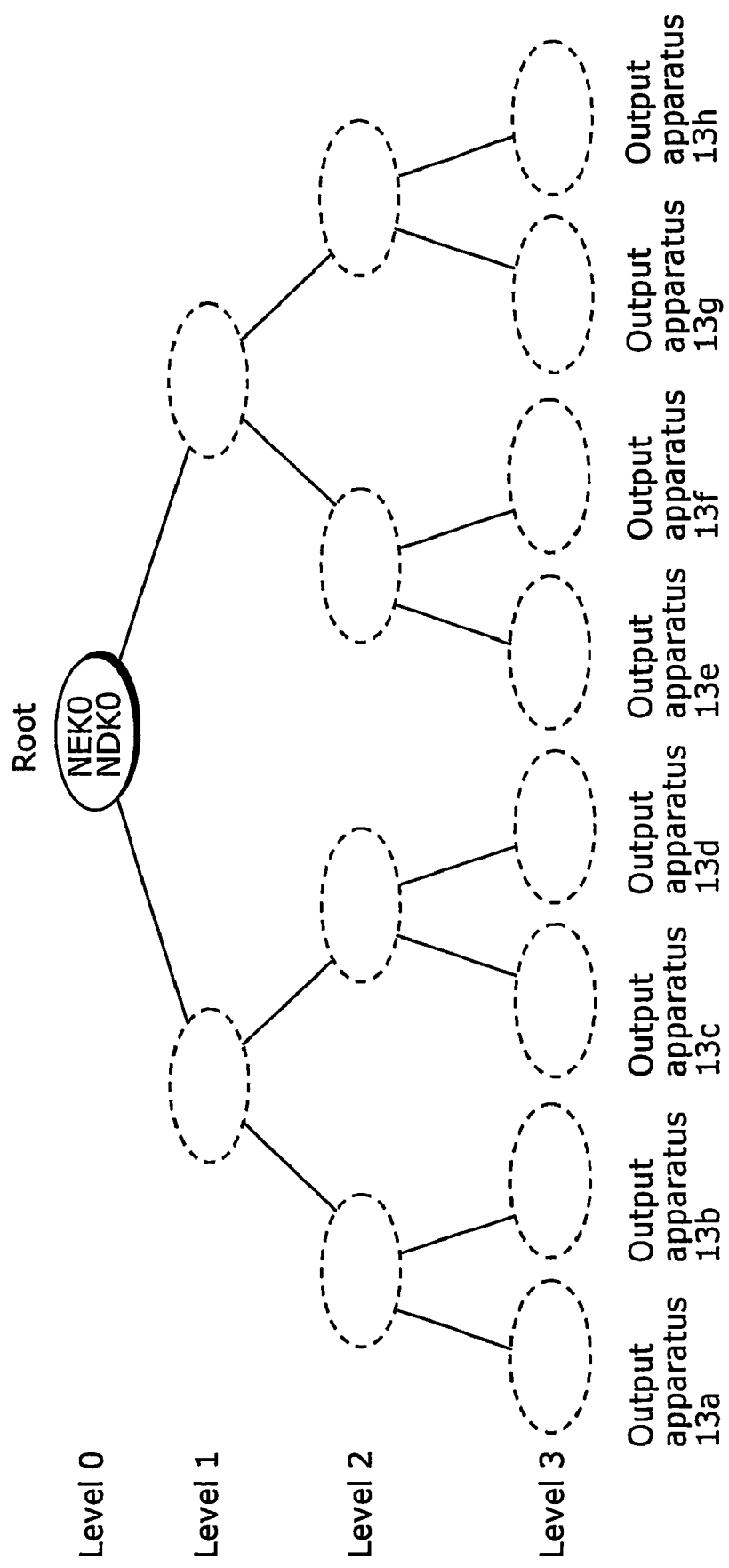
FIG. 32 is a diagram showing still another example of selection of a plurality of node encryption keys to be used for encrypting a content decryption key.
Figure 33:
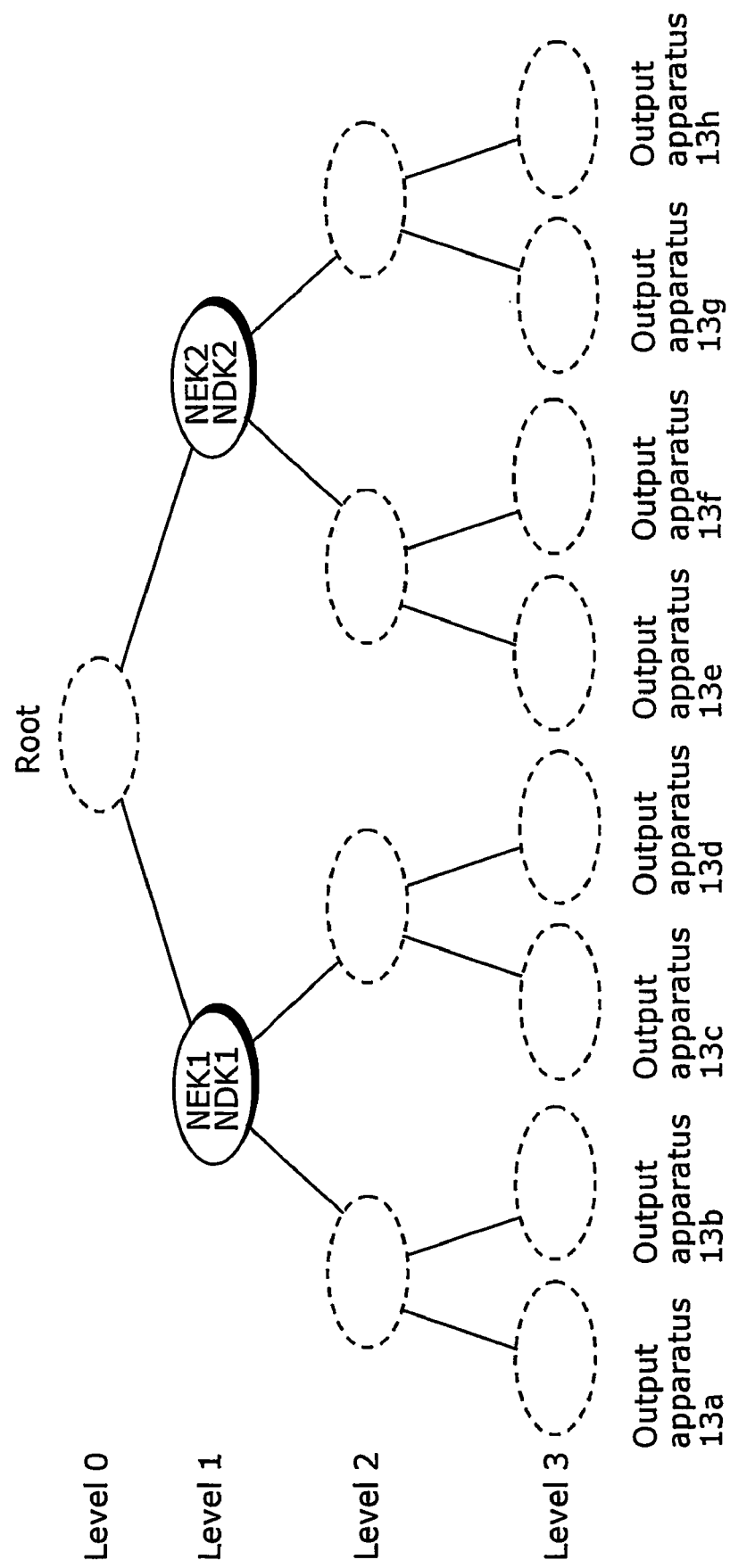
FIG. 33 is a diagram showing still another example of selection of a plurality of node encryption keys to be used for encrypting a content decryption key.

(13) A node encryption key group to be used for encrypting a content decryption key CDK may be fitted into a certain pattern and shared by the server 12 and the output apparatuses 13*a* to 13*h*. For example, it is assumed that a node encryption key group pattern as shown in FIG. 28 is the first pattern P1, a node encryption key group pattern as shown in FIG. 29 is the second pattern P2, a node encryption key group pattern as shown in FIG. 30 is the third pattern P3, and a node encryption key group pattern as shown in FIG. 31 is the fourth pattern P4, respectively, and the encrypted content key group ENCCDKG includes any of the first pattern P1 to the fourth pattern P4. In this case, each of the output apparatuses 13*a* to 13*h* may hold correspondence information indicating correspondence between node encryption key group patterns and node decryption keys, and the decryption key obtaining unit 132*a* may obtain the content decryption key CDK based on the correspondence information.

(14) A plurality of node encryption keys and corresponding node decryption keys may be set for each node except for terminal nodes.

Note that, in the above-mentioned first embodiment, since a terminal node key among assigned node decryption keys held in each output apparatus is unique to each output apparatus, an individual key held in the individual key storage unit 138*a* may also be used as the terminal node key. For example, the server may distribute only the assigned node decryption keys except the terminal node key to each output apparatus in order to use the individual key as the terminal node key.

Figure 34:
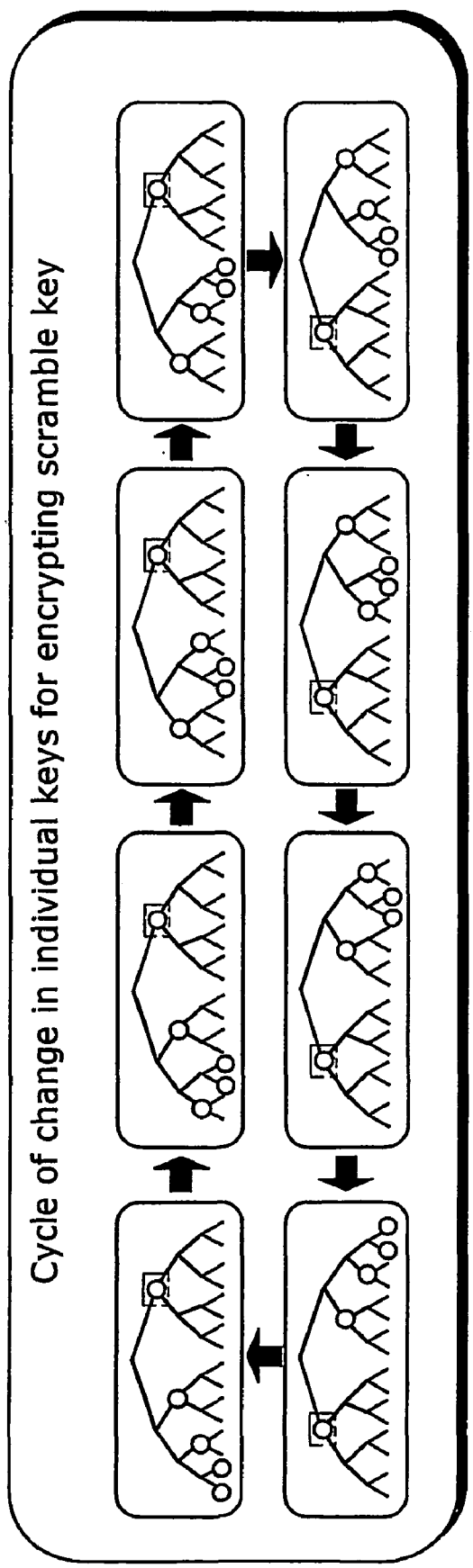
FIG. 34 is a diagram for explaining collusion resistance in the content distribution system according to the present invention.

FIG. 34 shows, for reference, a diagram for explaining collusion resistance in the content distribution system according to the present invention. In FIG. 34, node encryption keys for circled nodes are selected as keys for encrypting a scramble key, and changed in cycles. Here, "collusion resistance" is information indicating the threshold of the number of output apparatuses in a tree structure which leak key information, at which the origin of leakage of key information cannot be identified.

The following is the explanation of the case where node encryption keys for encrypting a scramble key are changed in cycles as shown in FIG. 34. First, in the case where one of the output apparatuses corresponding to the eight terminal nodes in the left half of the tree structure and one of the output apparatuses corresponding to the eight terminal nodes in the right half thereof are analyzed, two node decryption keys of the output apparatuses at the second level from the top are obtained (in FIG. 34, the two nodes at the second level are enclosed by dotted-line boxes in this diagram).

In this example, it becomes possible to obtain the keys for encrypting the scramble key through the entire cycle using these two node decryption keys only. Therefore, there is a possibility in the worst case that only these two keys are embedded in an unauthorized output apparatus. In such a case, since the node decryption key for the terminal node is not embedded in this unauthorized output apparatus, from which the origin of leakage cannot be traced. The value of the collusion resistance is 2 in the case shown in FIG. 34.

Under the circumstances, only the node decryption keys for the nodes at the Nth and lower levels (N is 3 or larger natural number) have to be used in order to improve the collusion resistance, whereas in the case of FIG. 34, only the node decryption keys for the nodes at the second and lower levels are selected in cycles. In more detail, if only the keys for the nodes at the Nth and lower levels are used, the value of the collusion resistance is about 2N (For example, the value of the collusion resistance is 2 if the keys for the nodes at the first and lower levels are used). However, the number of data to be distributed increases as the key level to be used becomes lower.

Furthermore, in the case where unauthorized output apparatuses to which terminal nodes are not assigned come into the market, if worst comes worst, it is possible, as an anti-collusion measure, to change a terminal node assigned to each output apparatus by the key issuing center into another one.

The content distribution system according to the present invention has an effect that even if a key embedded in an output apparatus is leaked and an unauthorized output apparatus is created using the leaked key, a content provider can trace the origin of the leakage by investigating the key information embedded in the unauthorized output apparatus. Therefore, the content distribution system according to the present invention is useful for distributing contents using a communication path such as the Internet, and it is further applicable to broadcasting and the like.

The invention claimed is:

1. A content distribution server that encrypts a content and distributes the encrypted content to content output apparatuses connected to the content distribution server via a network, each of the content output apparatuses decrypting the encrypted content and outputting the decrypted content, the content distribution server comprising:
    a key information storage unit, the key information storage unit being a hardware device and operable to hold a node encryption key group that is a set of node encryption keys which are previously assigned to the content output apparatuses using a predetermined key assignment method;
    an encryption key group selection unit operable to select, from among the node encryption key group, at least one node encryption key as a selected node encryption key group;
    a content decryption key selection unit operable to generate an encrypted content decryption key group that includes at least one encrypted content decryption key obtained by encrypting a previously given content decryption key using the at least one node encryption key in the selected node encryption key group;
    a content receiving unit operable to receive a content via the network;
    an encryption unit operable to encrypt the content using a content encryption key which is previously given as a pair with the content decryption key; and
    a transmission unit operable to distribute the encrypted content and the encrypted content decryption key group to the content output apparatuses;

wherein the key assignment method has a tree structure in which a plurality of content output apparatuses serve as nodes, and includes:

classifying the nodes into a plurality of levels from a $0^{th}$ level through an nth level, n being 1 or a larger natural number; and selecting, as terminal nodes in the tree structure, nodes each of which does not have a child node, from among the nodes, and said encryption key group selection unit selects the selected node encryption key group so that the selected node encryption key group includes at least one node encryption key that is set for a terminal node and at least one node encryption key that is set for a node other than the terminal nodes by randomly selecting a node encryption key that is set for a terminal node among the terminal nodes and then further selecting a node encryption key assigned to a content output apparatus to which the selected node encryption key is not assigned.

2. The content distribution server according to claim 1, wherein the tree structure in the key assignment method is an N-ary tree, N being 2 or a larger natural number.

3. The content distribution server according to claim 1, further comprising a content key generation unit operable to newly generate at least one pair of a content encryption key and a corresponding content decryption key which is different from at least one pair of a content encryption key which is previously used for encrypting a content and a corresponding content decryption key, in the case where said content receiving unit receives a new content.

4. The content distribution server according to claim 1, wherein said encryption key group selection unit newly selects a node encryption key that is set for another terminal node than a previously selected terminal node, in the case of receiving a new content via said content receiving unit when selecting the node encryption key that is set for the at least one terminal node among the terminal nodes.

5. The content distribution server according to claim 1, further comprising a key selection information storage unit operable to hold a plurality of key selection information which are used for selecting the node encryption key included in the node encryption key group, wherein said encryption key group selection unit selects the selected node encryption key group based on the key selection information.

6. The content distribution server according to claim 5, wherein said key selection information storage unit further holds a plurality of key selection identifiers that identify the key selection information, the key selection identifiers and the key selection information being associated with each other, said encryption key group selection unit selects the selected node encryption key group based on the key selection information, and said transmission unit distributes, to the content output apparatuses, the encrypted content, the encrypted content decryption key group and the key selection identifiers associated with the key selection information.

7. The content distribution server according to claim 5, wherein said encryption key group selection unit selects, on a random basis, one of the key selection information from among the plurality of key selection information held in said key selection information storage unit, and selects the selected node encryption key group based on the selected key selection information.

8. The content distribution server according to claim 5, wherein said encryption key group selection unit selects, at regular intervals, one of the key selection information from among the plurality of key selection information held in said key selection information storage unit, and selects the selected node encryption key group based on the selected key selection information.

9. The content distribution server according to claim 1, further comprising a storage unit operable to store the node encryption key group received via the network into said key information storage unit.

10. A content distribution system comprising content output apparatuses and a content distribution server, each of the content output apparatuses decrypting an encrypted content using a content decryption key and outputting the decrypted content, and a content distribution server creating an encrypted content by encrypting a content, and distributing the encrypted content to each content output apparatus via a network, wherein said content output apparatus includes:

a first receiving unit operable to receive the encrypted content and an encrypted content decryption key group which are distributed from the content distribution server;

a second receiving unit operable to receive, via the network, a node decryption key group which is previously assigned by a predetermined key assignment method;

a node key storage unit operable to hold the node decryption key group;

a decryption key obtaining unit operable to obtain the content decryption key based on at least one node decryption key group and at least one encrypted content decryption key group; and a first decryption unit operable to decrypt the encrypted content using the content decryption key, and said content distribution server includes:

a key information storage unit operable to hold a node encryption key group that is a set of node encryption keys which are previously assigned to the content output apparatuses using a predetermined key assignment method;

an encryption key group selection unit operable to select, from among the node encryption key group, at least one node encryption key as a selected node encryption key group;

a content decryption key selection unit operable to generate an encrypted content decryption key group that includes at least one encrypted content decryption key obtained by encrypting a previously given content decryption key using said at least one node encryption key in the selected node encryption key group;

a content receiving unit operable to receive a content via the network;

an encryption unit operable to encrypt the content using a content encryption key which is previously given as a pair with the content decryption key; and a transmission unit operable to distribute the encrypted content and the encrypted content decryption key group to the content output apparatuses, wherein the key assignment method has a tree structure in which a plurality of content output apparatuses serve as nodes, and includes:

classifying the nodes into a plurality of levels from a $0^{th}$ level through an nth level, n being 1 or a larger natural number; and selecting, as terminal nodes in the tree structure, nodes each of which does not have a child node, from among the nodes, and said encryption key group selection unit selects the selected node encryption key group so that the selected node encryption key group includes at least one node encryption key that is set for a terminal node and at least one node encryption key that is set for a node other than the terminal nodes by randomly selecting a node encryption key that is set for a terminal node among terminal nodes and then further selecting a node encryption key assigned to a content output apparatus to which the selected node encryption key is not assigned.

11. The content distribution system according to claim 10, further comprising a key issuing center that is connected, via a network, with the content distribution server and the content output apparatuses, and issues a key for obtaining a content decryption key to each of the content output apparatuses, wherein the key issuing center includes:

a node key generation unit operable to generate, based on a predetermined key assignment method, a node encryption key group that is a set of node encryption keys and a node decryption key group that is a set of node decryption keys, each of the node encryption keys and node decryption keys being assigned to each content output apparatus;

a first transmission unit operable to transmit the node encryption key group to the content distribution server;

a node decryption key group selection unit operable to select at least one of the node decryption keys, and generate the node decryption key group to be distributed to each content output apparatus; and a second transmission unit operable to distribute the node decryption key group to the content output apparatus.

12. A non-transitory computer-readable recording medium on which a program is recorded, the program being used for a content distribution server that encrypts a content and distributes the encrypted content to content output apparatuses connected to the content distribution server via a network, each of the content output apparatuses decrypting the encrypted content and outputting the decrypted content, the program comprising:

holding a node encryption key group that is a set of node encryption keys which are previously assigned to the content output apparatuses using a predetermined key assignment method;

selecting, from among the node encryption key group, at least one node encryption key as a selected node encryption key group;

generating an encrypted content decryption key group that includes at least one encrypted content decryption key obtained by encrypting a previously given content decryption key using said at least one node encryption key in the selected node encryption key group;

receiving a content via the network;

encrypting the content using a content encryption key which is previously given as a pair with the content decryption key; and distributing the encrypted content and the encrypted content decryption key group to the content output apparatuses, wherein the key assignment method has a tree structure in which a plurality of content output apparatuses serve as nodes, and includes:

classifying the nodes into a plurality of levels from a $0^{th}$ level to an nth level, n being 1 or a larger natural number; and selecting, as terminal nodes in the tree structure, nodes each of which does not have a child node, from among the nodes, and said encryption key group selection unit selects the selected node encryption key group so that said selected node encryption key group includes at least one node encryption key that is set for a terminal node and at least one node encryption key that is set for the selected terminal node and node encryption key that is set for a node other than the terminal nodes by randomly selecting a node encryption key that is set for a terminal node among terminal nodes and then further selecting a node encryption key assigned to a content output apparatus to which the selected node encryption key is not assigned.

13. A content distribution method to be used for a content distribution server that encrypts a content and distributes the encrypted content to content output apparatuses connected to the content distribution server via a network, each of the content output apparatuses decrypting the encrypted content and outputting the decrypted content, the method comprising:

holding a node encryption key group that is a set of node encryption keys which are previously assigned to the content output apparatuses using a predetermined key assignment method;

selecting, from among the node encryption key group, at least one node encryption key as a selected node encryption key group;

generating an encrypted content decryption key group that includes at least one encrypted content decryption key obtained by encrypting a previously given content decryption key using said at least one node encryption key in the selected node encryption key group;

receiving a content via the network;

encrypting the content using a content encryption key which is previously given as a pair with the content decryption key; and distributing the encrypted content and the encrypted content decryption key group to the content output apparatuses, wherein the key assignment method has a tree structure in which a plurality of content output apparatuses serve as nodes, and includes:

classifying the nodes into a plurality of levels from a 0 th level through an nth level, n being 1 or a larger natural number; and selecting, as terminal nodes in the tree structure, nodes each of which does not have a child node, from among the nodes, and said encryption key group selection unit selects the selected node encryption key group so that said selected node encryption key group includes at least one node encryption key that is set for a terminal node and at least one node encryption key that is set for a node other than the terminal nodes by randomly selecting a node encryption key that is set for a terminal node among the terminal nodes and then further selecting a node encryption key assigned to a content output apparatus to which the selected node encryption key is not assigned.

* * * * *